US012732562B2

(12) United States Patent
Hayakawa et al.

(10) Patent No.: US 12,732,562 B2
(45) Date of Patent: Sep. 8, 2026

(54) STORAGE SYSTEM

(71) Applicant: Hitachi Vantara, Ltd., Yokohama (JP)

(72) Inventors: Hitoshi Hayakawa, Tokyo (JP); Nobuhiro Yokoi, Tokyo (JP); Takayuki Fukatani, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 31 days.

(21) Appl. No.: 18/830,790

(22) Filed: Sep. 11, 2024

(65) Prior Publication Data

US 2025/0267199 A1 Aug. 21, 2025

(30) Foreign Application Priority Data

Feb. 21, 2024 (JP) ................................. 2024-024729

(51) Int. Cl.
*H04L 67/141* (2022.01)
*H04L 67/1097* (2022.01)
*H04L 67/143* (2022.01)

(52) U.S. Cl.
CPC ........ *H04L 67/141* (2013.01); *H04L 67/1097* (2013.01); *H04L 67/143* (2013.01)

(58) Field of Classification Search
CPC .... G06F 13/1668; G06F 3/0605; G06F 3/061; G06F 3/0647; G06F 3/0658; G06F 3/0659; G06F 3/0665; G06F 3/067; G06F 3/0689; H04L 67/10; H04L 67/1095; H04L 67/1097; H04L 67/141; H04L 67/143; H04L 67/34; H04L 69/16
See application file for complete search history.

(56) References Cited

U.S. PATENT DOCUMENTS

2012/0030364 A1* 2/2012 Morimoto ............... H04L 49/90 709/228
2021/0303500 A1* 9/2021 Arul Dhas ............ G06F 3/0635
2022/0353240 A1* 11/2022 McDowall .......... H04L 63/0227
2022/0374379 A1* 11/2022 Galles ................. H04L 41/5077
2022/0377027 A1* 11/2022 Gai ......................... H04L 45/74
2022/0391333 A1* 12/2022 Veluswamy .......... G06F 9/5016
2023/0328008 A1 10/2023 Yokoi et al.
(Continued)

FOREIGN PATENT DOCUMENTS

JP 2022-048675 A 3/2022
JP 2022-113983 A 8/2022
(Continued)

OTHER PUBLICATIONS

Japanese Office Action received in corresponding Japanese Application No. 2024-024729 dated Mar. 17, 2026.

*Primary Examiner* — Christopher Biagini
(74) *Attorney, Agent, or Firm* — MATTINGLY & MALUR, PC

(57) ABSTRACT

A storage system communicates with a host in a session including one or more connections. The storage system includes a front-end interface, a processor, and a storage area. The storage area stores session management information for managing the session of the communication with the host. The front-end interface stores connection management information for managing the connection of the session. The front-end interface controls access from the host by referring to the connection management information.

10 Claims, 27 Drawing Sheets

(56) References Cited

U.S. PATENT DOCUMENTS

| | | | | |
|---|---|---|---|---|
| 2023/0376210 | A1* | 11/2023 | Wang | G06F 3/0659 |
| 2023/0409488 | A1* | 12/2023 | Vargaftik | H04L 45/742 |
| 2023/0412489 | A1 | 12/2023 | Wang et al. | |
| 2024/0092976 | A1 | 3/2024 | Negishi | |

FOREIGN PATENT DOCUMENTS

| | | | | | |
|---|---|---|---|---|---|
| JP | 2023-054705 | A | | 4/2023 | |
| JP | 2023-142021 | A | | 10/2023 | |
| JP | 2024011738 | A | * | 1/2024 | G06F 3/0611 |

* cited by examiner

| Subsystem ID C101 | Subsystem NQN C102 | Port ID C103 |
|---|---|---|
| SUB0 | nqn.2023.com.hitachi:sn.0 | P0-A0-0 |
| | | P0-A1-0 |
| | | P1-A0-0 |
| SUB1 | nqn.2023.com.hitachi:sn.1 | P0-A0-0 |
| SUB2 | nqn.2023.com.hitachi:sn.2 | P0-A1-0 |

| Subsystem ID C201 | Namespace ID C202 | LDEV ID C203 |
|---|---|---|
| SUB0 | 1 | LDEV1 |
| | 2 | LDEV2 |
| | 3 | LDEV3 |
| SUB1 | 1 | LDEV2 |
| SUB2 | 1 | LDEV2 |

| Controller ID C301 | Subsystem ID C302 | Port ID C303 | Host NQN C304 | Host ID C305 | PROTOCOL C306 | NUMBER OF SCHEDULED QUEUES C307 | NUMBER OF CONNECTIONS C308 |
|---|---|---|---|---|---|---|---|
| CTL00 | SUB0 | P0-A0-0 | nqn.2023.host1 | 1 | NVMe/TCP | 4 | 1 |
| CTL10 | SUB1 | P0-A0-0 | nqn.2023.host2 | 2 | NVMe/TCP | 4 | 2 |
| CTL20 | SUB2 | P0-A1-0 | nqn.2023.host3 | 3 | NVMe/TCP | 4 | 3 |

| Controller ID C501 | Subsystem ID C502 | Port ID C503 | Host NQN C504 | Host ID C505 | PROTOCOL C506 | NUMBER OF SCHEDULED QUEUES C507 | NUMBER OF CONNECTIONS C508 | AVAILABLE Namespace ID C509 |
|---|---|---|---|---|---|---|---|---|
| CTL00 | SUB0 | P0-A0-0 | nqn.2023.host1 | 1 | NVMe/TCP | 4 | 1 | 1, 2 |
| CTL10 | SUB1 | P0-A0-0 | nqn.2023.host2 | 2 | NVMe/TCP | 4 | 2 | 1 |
| CTL20 | SUB2 | P0-A1-0 | nqn.2023.host3 | 3 | NVMe/TCP | 4 | 3 | 1 |

| CONNECTION ID C601 | Controller ID C602 | HOST IP ADDRESS C603 | HOST PORT NUMBER C604 | TARGET IP ADDRESS C605 | TARGET PORT NUMBER C606 | QUEUE ID C607 | CONNECTION CONFIGURATION C608 |
|---|---|---|---|---|---|---|---|
| CONN0 | CTL00 | 192.168.0.2 | 4040 | 192.168.0.1 | 4420 | 0 | 15 |
| CONN1 | CTL00 | 192.168.0.2 | 4041 | 192.168.0.1 | 4420 | 1 | 15 |
| CONN2 | CTL00 | 192.168.0.2 | 4042 | 192.168.0.1 | 4420 | 2 | 15 |

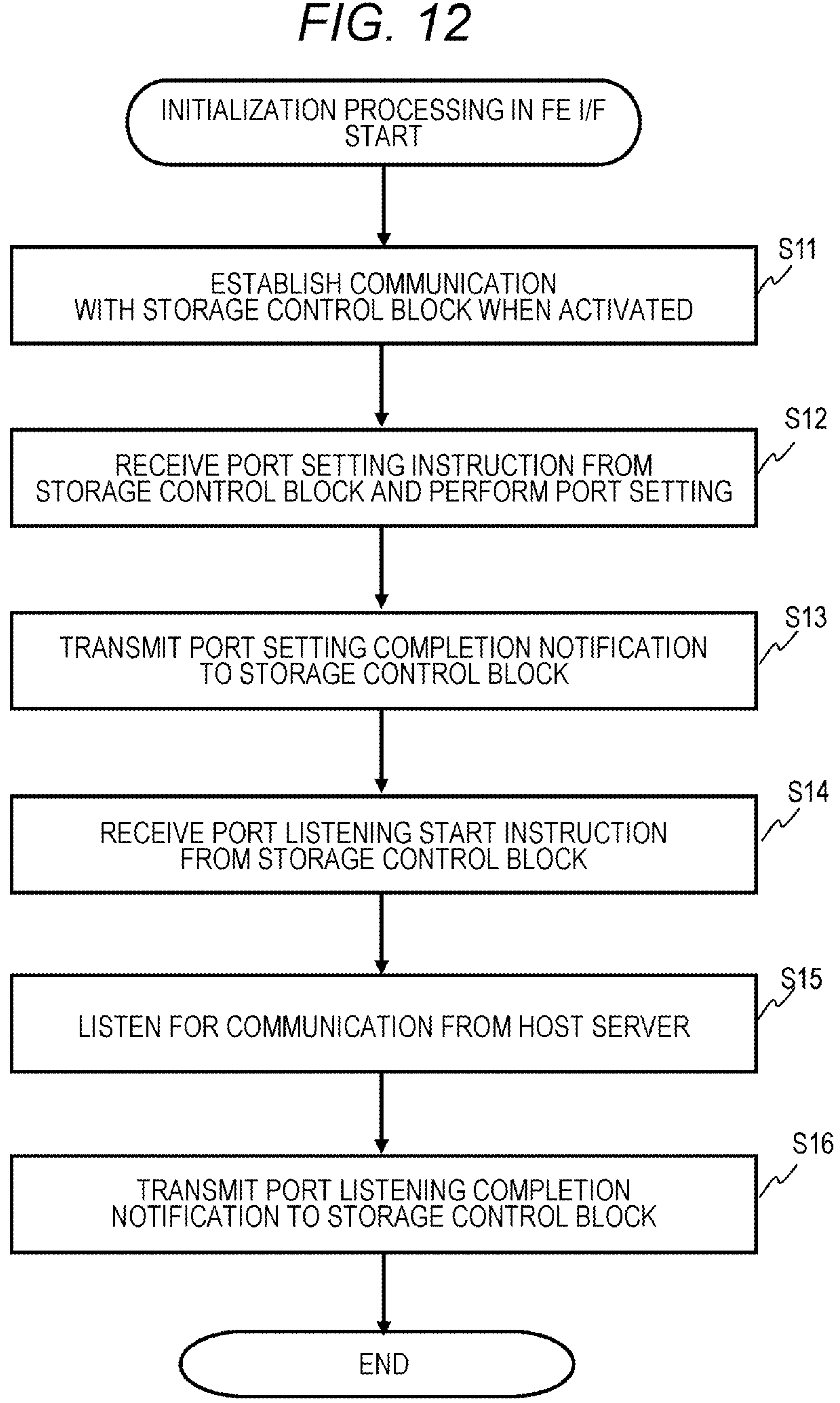
FIG. 12
INITIALIZATION PROCESSING IN FE I/F START
ESTABLISH COMMUNICATION WITH STORAGE CONTROL BLOCK WHEN ACTIVATED
S11
RECEIVE PORT SETTING INSTRUCTION FROM STORAGE CONTROL BLOCK AND PERFORM PORT SETTING
S12
TRANSMIT PORT SETTING COMPLETION NOTIFICATION TO STORAGE CONTROL BLOCK
S13
RECEIVE PORT LISTENING START INSTRUCTION FROM STORAGE CONTROL BLOCK
S14
LISTEN FOR COMMUNICATION FROM HOST SERVER
S15
TRANSMIT PORT LISTENING COMPLETION NOTIFICATION TO STORAGE CONTROL BLOCK
S16
END

FIG. 14

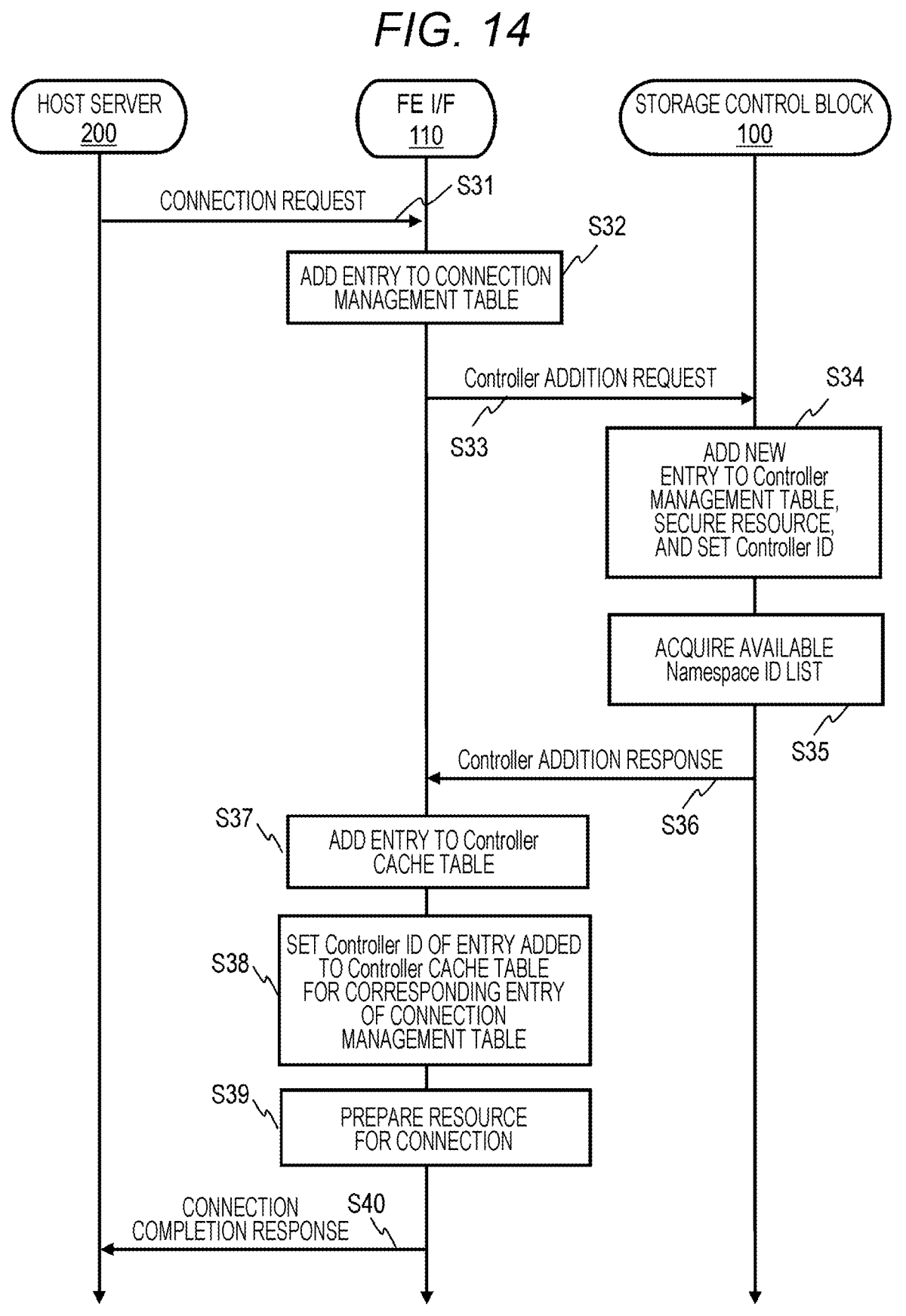

HOST SERVER 200

FE I/F 110

STORAGE CONTROL BLOCK 100

S31 CONNECTION REQUEST

S32 ADD ENTRY TO CONNECTION MANAGEMENT TABLE

S33 Controller ADDITION REQUEST

S34 ADD NEW ENTRY TO Controller MANAGEMENT TABLE, SECURE RESOURCE, AND SET Controller ID S35 ACQUIRE AVAILABLE Namespace ID LIST S36 Controller ADDITION RESPONSE S37 ADD ENTRY TO Controller CACHE TABLE S38 SET Controller ID OF ENTRY ADDED TO Controller CACHE TABLE FOR CORRESPONDING ENTRY OF CONNECTION MANAGEMENT TABLE

S39 PREPARE RESOURCE FOR CONNECTION

S40 CONNECTION COMPLETION RESPONSE

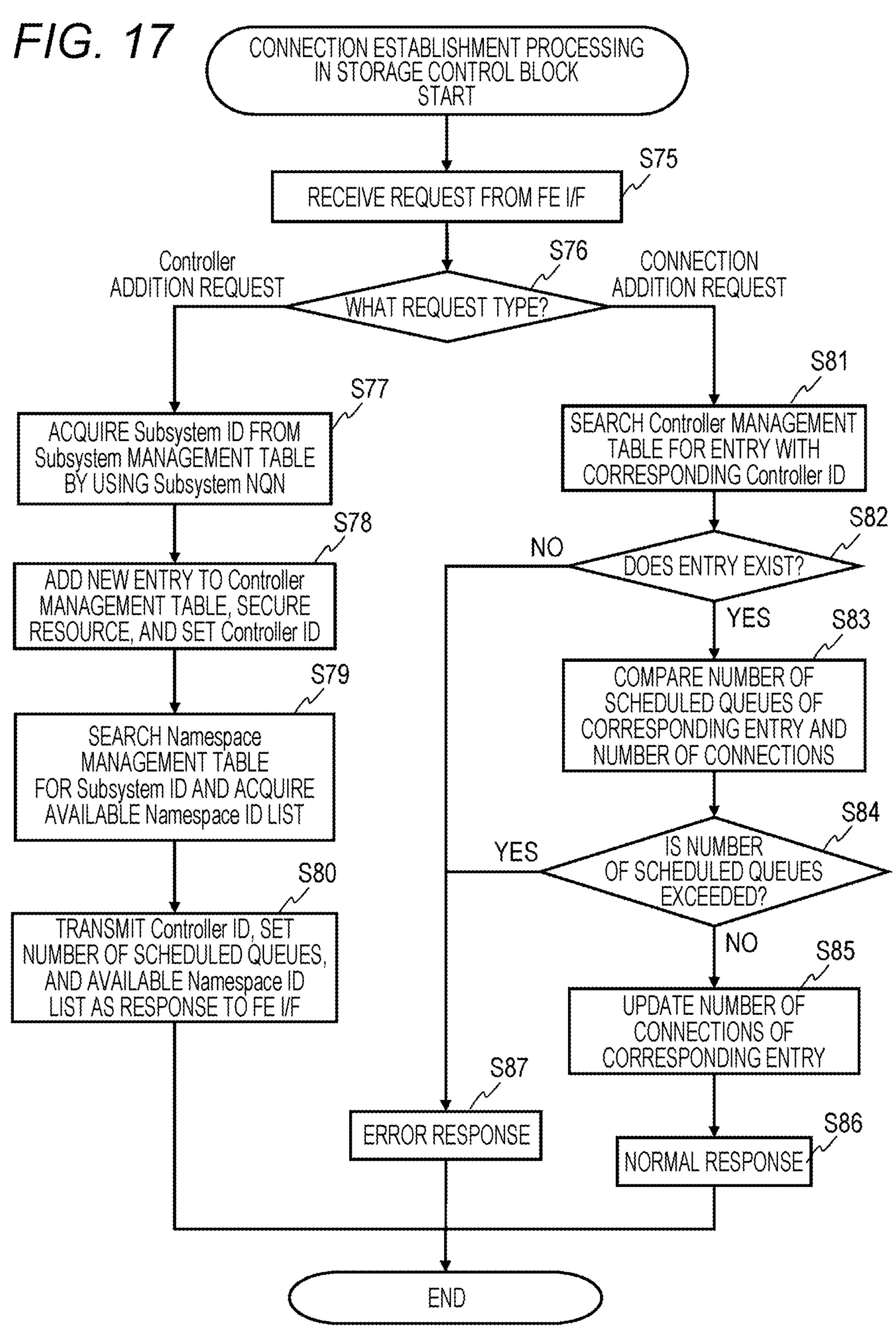
FIG. 17
CONNECTION ESTABLISHMENT PROCESSING IN STORAGE CONTROL BLOCK START
S75
RECEIVE REQUEST FROM FE I/F
S76
WHAT REQUEST TYPE?
Controller ADDITION REQUEST
CONNECTION ADDITION REQUEST
S77
ACQUIRE Subsystem ID FROM Subsystem MANAGEMENT TABLE BY USING Subsystem NQN
S78
ADD NEW ENTRY TO Controller MANAGEMENT TABLE, SECURE RESOURCE, AND SET Controller ID
S79
SEARCH Namespace MANAGEMENT TABLE FOR Subsystem ID AND ACQUIRE AVAILABLE Namespace ID LIST
S80
TRANSMIT Controller ID, SET NUMBER OF SCHEDULED QUEUES, AND AVAILABLE Namespace ID LIST AS RESPONSE TO FE I/F
S81
SEARCH Controller MANAGEMENT TABLE FOR ENTRY WITH CORRESPONDING Controller ID
S82
DOES ENTRY EXIST?
NO
YES
S83
COMPARE NUMBER OF SCHEDULED QUEUES OF CORRESPONDING ENTRY AND NUMBER OF CONNECTIONS
S84
IS NUMBER OF SCHEDULED QUEUES EXCEEDED?
YES
NO
S85
UPDATE NUMBER OF CONNECTIONS OF CORRESPONDING ENTRY
S87
ERROR RESPONSE
S86
NORMAL RESPONSE
END

*FIG. 27*

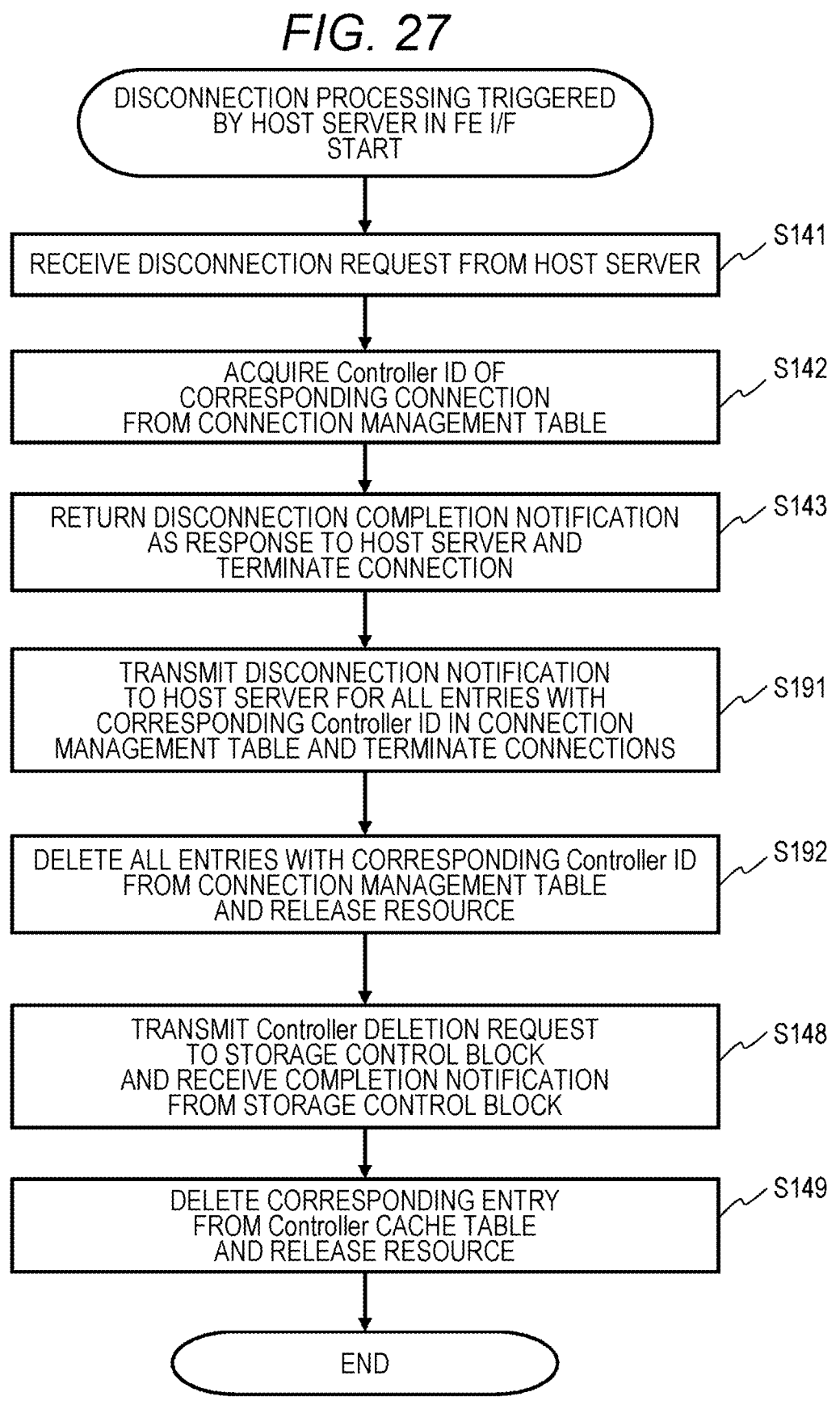

DISCONNECTION PROCESSING TRIGGERED BY HOST SERVER IN FE I/F START

S141: RECEIVE DISCONNECTION REQUEST FROM HOST SERVER

S142: ACQUIRE Controller ID OF CORRESPONDING CONNECTION FROM CONNECTION MANAGEMENT TABLE S143: RETURN DISCONNECTION COMPLETION NOTIFICATION AS RESPONSE TO HOST SERVER AND TERMINATE CONNECTION S191: TRANSMIT DISCONNECTION NOTIFICATION TO HOST SERVER FOR ALL ENTRIES WITH CORRESPONDING Controller ID IN CONNECTION MANAGEMENT TABLE AND TERMINATE CONNECTIONS S192: DELETE ALL ENTRIES WITH CORRESPONDING Controller ID FROM CONNECTION MANAGEMENT TABLE AND RELEASE RESOURCE S148: TRANSMIT Controller DELETION REQUEST TO STORAGE CONTROL BLOCK AND RECEIVE COMPLETION NOTIFICATION FROM STORAGE CONTROL BLOCK S149: DELETE CORRESPONDING ENTRY FROM Controller CACHE TABLE AND RELEASE RESOURCE

END

| CONNECTION ID C601 | Controller ID C602 | HOST IP ADDRESS C603 | HOST PORT NUMBER C604 | TARGET IP ADDRESS C605 | TARGET PORT NUMBER C606 | QUEUE ID C607 | CONNECTION CONFIGURATION C608 | ASSIGNED CORE C609 |
|---|---|---|---|---|---|---|---|---|
| CONN0 | CTL00 | 192.168.0.2 | 4040 | 192.168.0.1 | 4420 | 0 | 15 | CC0 |
| CONN1 | CTL00 | 192.168.0.2 | 4041 | 192.168.0.1 | 4420 | 1 | 15 | CC1 |
| CONN2 | CTL00 | 192.168.0.2 | 4042 | 192.168.0.1 | 4420 | 2 | 15 | CC2 |

STORAGE SYSTEM

CLAIM OF PRIORITY

The present application claims priority from Japanese patent application JP 2024-024729 filed on Feb. 21, 2024, the content of which is hereby incorporated by reference into this application.

BACKGROUND OF THE INVENTION

1. Field of the Invention

The present invention relates to a storage system.

2. Description of the Related Art

In recent information systems, storage area networks (SANs) have been widely used as a form of connecting storage systems and host servers. In a configuration of the SAN, the storage system and the host server are connected via a switch using a network cable such as an optical fiber. Storage resources can be shared among multiple host servers by using the SAN. Software that operates in the host server and accesses the storage system is referred to as an initiator, and software that operates in the storage system, accepts storage access from the initiator, and provides access to the storage is referred to as a target in this document.

There are an FC-SAN using Fibre Channel (FC) and Internet Protocol (IP)-SAN using the Ethernet as types of the SAN. Since the FC-SAN performs lossless data transfer using a dedicated interface module and an FC switch, it is possible to configure a highly reliable and mission critical IT system. On the other hand, the IP-SAN is based on a standard IP protocol, and can thus be easily handled without advanced expertise required in the FC-SAN. As communication data retransmission control can be performed in the transmission control protocol (TCP) layer over the IP, reliability can be secured in the IP-SAN, resulting an increase of adoption of the IP-SAN to mission critical information systems. In addition, with the spread of 100 Gb Ethernet and 200 Gb Ethernet, the IP-SAN is expected to enhance the communication capacity.

With the spread of storage using a non-volatile memory, Non-Volatile Memory Express over Transmission Control Protocol (NVMe/TCP) as the protocol for the IP-SAN is expected to further improve performance comparing to that of the widespread conventional Internet Small Computer System Interface (iSCSI).

In the case of the iSCSI, a logical connection between the initiator and the target is referred to as a session, and in single session, an iSCSI request/response is basically exchanged on one TCP connection to access the storage from a host server.

On the other hand, in the case of the NVMe/TCP, in NVMe Association (which corresponds to the session in the iSCSI and which hereinafter is referred to as the "session" unless it is necessary to distinguish the protocols) which is a logical connection between the host server and the storage system, an NVMe request/response is exchanged using one or more TCP connections (NVMe/TCP connections) (hereinafter, iSCSI and NVMe/TCP are simply referred to as the "connections" in the present specification unless it is necessary to distinguish the protocols). As a result, in the NVMe/TCP, storage access with an increased degree of input/output (IO) parallelism becomes possible, and storage access with broader bandwidth in lower delay can be achieved compared to that in iSCSI.

SUMMARY OF THE INVENTION

JP 2023-142021 A discloses a smart network interface card (SmartNIC)-utilized storage system in which a SmartNIC is installed in a controller of a storage system and protocol processing is performed by the SmartNIC. The SmartNIC is a network interface device equipped with a central processing unit (CPU) and a memory, and can operate a general-purpose operating system (OS) or an open source software (OSS) protocol server.

By operating protocol-related software on the SmartNIC separately from a storage controller, a load of the controller can be reduced to improve storage performance, and the software on the SmartNIC can be modified without much modification of the controller to cope with new protocols and communication functions.

In a protocol that improves storage access performance by increasing the degree of IO parallelism like the NVMe/TCP, the number of connections per initiator increases as compared with a protocol in which access is made by a single connection like the iSCSI. This is because the initiator normally operates on multiple central processing unit (CPU) cores, and the CPU cores share storage access processing of multiple connections, so that improvement in storage access performance can be expected. Therefore, the same number of connections as the number of CPU cores are established in order to achieve the highest access performance. However, in recent years, the number of CPU cores exceeds 100 in some cases, and in this case, more than 100 connections are required for establishing one session in the NVMe/TCP.

JP 2023-142021 A does not disclose a detailed operation at the time of session establishment. Since session management in the storage system needs to be performed by the controller, in the session establishment in the iSCSI in which a single connection is assumed, it is natural that the SmartNIC notifies the controller every time a connection is established, and the connection, that is, the session, is managed in the controller.

However, when such a configuration is applied to the NVMe/TCP, every time a large number of connections (NVMe/TCP connections) of one session (NVMe association) are established, the SmartNIC notifies the controller to manage the large number of connections as the session in the controller.

As a result, it takes time to establish one session. Furthermore, in a case where the initiator sequentially establishes connections, that is, the initiator starts the next connection processing after one connection processing is completed, it takes more time to establish a session. Depending on a configuration and requirements of the initiator, there is a possibility that delayed session establishment is regarded as a session establishment failure.

That is, in a storage protocol in which one session is consist of multiple connections, a time required for session establishment becomes a critical issue.

One aspect of the present invention is a storage system that communicates with a host in a session including one or more connections, the storage system including a front-end interface, a processor, and a storage area, in which the storage area stores session management information for managing the session of the communication with the host, the front-end interface stores connection management information for managing the connection of the session, and the front-end interface controls access from the host by referring to the connection management information.

According to one aspect of the present invention, it is possible to shorten a time required for establishment of a session including a plurality of connections.

BRIEF DESCRIPTION OF THE DRAWINGS

FIG. 6 illustrates a configuration example of a Subsystem management table;

FIG. 7 illustrates a configuration example of a Namespace management table;

FIG. 8 illustrates a configuration example of a Controller management table;

FIG. 9 illustrates a configuration example of a Controller cache table;

FIG. 10 illustrates a configuration example of a connection management table;

FIG. 12 is a flowchart of initialization processing in the FE I/F;

FIG. 14 is a sequence diagram of management queue connection establishment processing;

FIG. 17 is a flowchart of connection establishment processing in the storage control block;

FIG. 27 is a flowchart of disconnection processing triggered by a host server in an FE I/F according to a second embodiment; and FIG. 28 illustrates a configuration example of a connection management table according to a fourth embodiment.

DESCRIPTION OF THE PREFERRED EMBODIMENTS

First Embodiment

Figure 1:
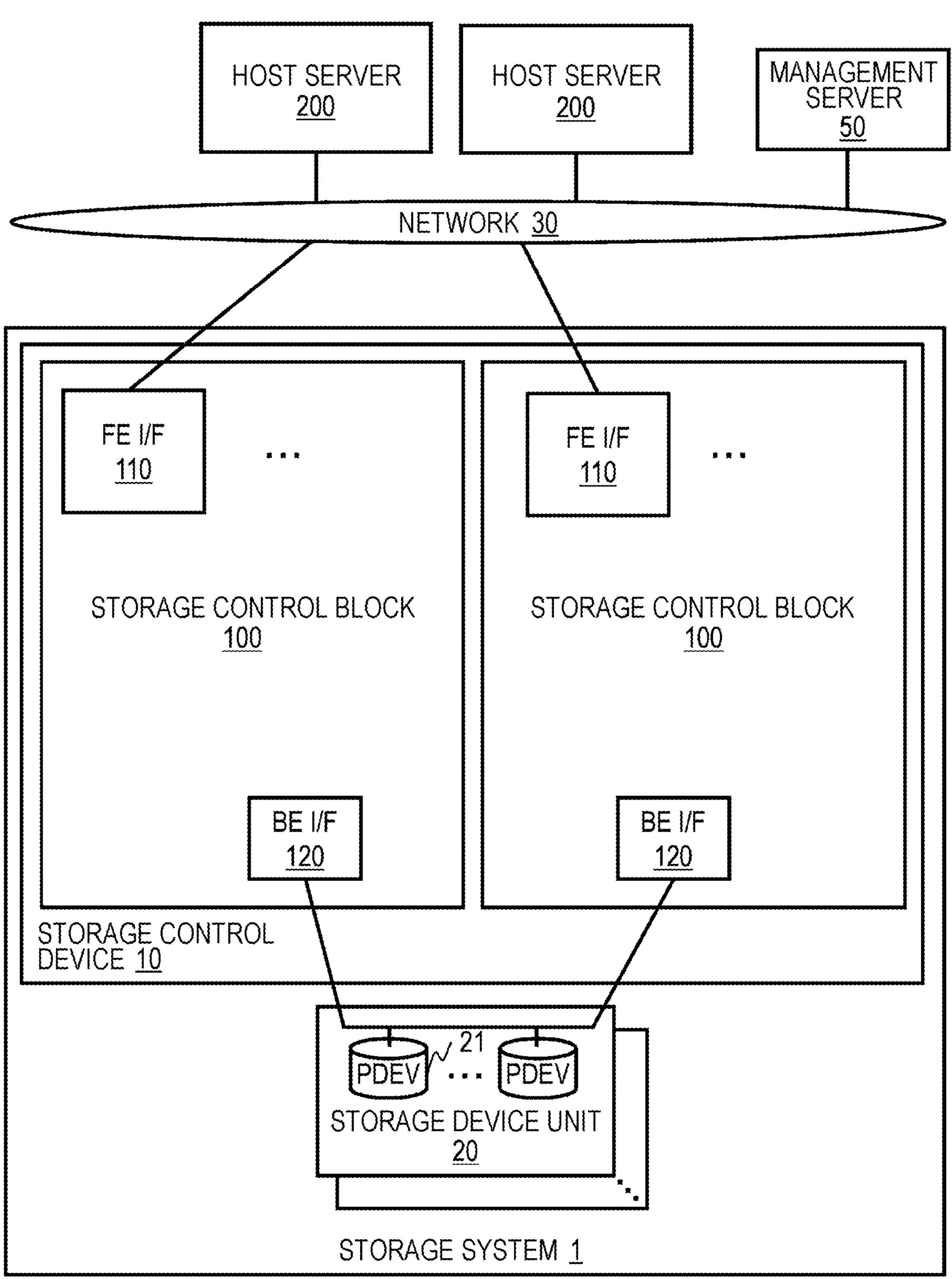
FIG. 1 is an overall configuration diagram of an information system according to a first embodiment.

Hereinafter, a configuration implemented by general hardware will be described as a configuration of an information system, but a configuration of the present invention is not limited to hardware, and a part of or the entire hardware may be implemented by software using a virtualization technology to secure flexibility at the time of changing the information system. In addition, a description will be given assuming that the number of components such as a storage area, a central processing unit (CPU), and a bus is one unless otherwise specified, but a plurality of components may be prepared to achieve redundancy and load distribution, or a component may be divided to improve convenience and cost performance. The bus may be divided to facilitate arbitration, or performance may be improved using a broadband bus called Peripheral Component Interconnect-Express (PCIe).

The storage area is also referred to as a memory, and is generally an area that stores information and is configured by a dynamic random access memory (DRAM) or the like. A storage capacity, access speed, and cost may be optimized by hierarchizing memories using, for example, a static random access memory (SRAM), a flash memory, a hard disk drive (HDD), or the like. In addition, the storage area necessary for a computer may be saved by placing a part of or the entire storage area at a remote location and accessing the storage area via a network connected via an input/output device to use the storage area as appropriate.

The following description of the configuration is based on a general configuration of a computer including a CPU, a storage area, an input/output device, and a bus. Therefore, even without describing individually, a program to be executed by the CPU and data are stored in the storage area to control a behavior of the computer. In addition, a device that is generally widely used in a computer may be added to improve convenience. For example, a serial bus may be added, and a user interface device such as a keyboard or a display may be added to improve operability of the information system by an operator, or convenience may be improved by adopting a configuration in which the operator accesses from a remote location via a network.

In a storage system according to an embodiment of the present invention, at the time of the first connection establishment among a plurality of connections constituting a session, a front-end interface (FE I/F) notifies a processor of a storage control block of the information. The storage control block creates management information of a new session including the notified first connection. Further, information of each connection is managed by the FE I/F, and is managed in association with session management information of the storage control block. According to an embodiment of the present invention, in the storage system equipped with the FE I/F, it is possible to shorten a time required for session establishment when a protocol in which one session is constituted by a plurality of connections is used.

FIG. 1 is an overall configuration diagram of an information system according to a first embodiment. The information system includes one or more host servers 200, a storage system 1, a network 30, and a management server 50. The host server 200, the storage system 1, and the management server 50 are connected to each other via a network 3.

The storage system 1 includes one or more storage device units 20 and a storage control device 10. The storage control device 10 includes one or more storage control blocks 100. In order to improve availability of the storage system 1, a plurality of storage control blocks 100 may be mounted on the storage control device 10, and each storage control block 100 may be powered by a dedicated power supply. In addition, a plurality of storage control devices 10 may be mounted and interconnected via a host channel adapter (HCA) network to improve performance by improving the availability and distributing a load.

The storage control device 10 or the storage control block 100 is also generally referred to as a storage controller or simply a controller, and provides a storage function. Although FIG. 1 illustrates a configuration example in which two storage control blocks 100 are held in the storage control device 10 to achieve redundancy, a simple configuration in which only one storage control block 100 is provided and also serves as the storage control device 10 may be adopted. In this case, the storage control block 100 serves as the storage controller.

The storage control block 100 includes a back-end interface (BE I/F) 120 and one or more FE I/Fs 110. In this example, the FE I/F 110 is a smart network interface card (SmartNIC).

The storage device unit 20 includes one or more PDEVs 21. The PDEV 21 means a physical device, and for example, a hard disk drive (HDD), another storage device (non-volatile storage device), a flash memory device such as a solid state drive (SSD), a dynamic random access memory (DRAM) equipped with a battery, or the like is used.

The storage device unit 20 may include different types of PDEVs 21 to improve failure tolerance and optimize performance and cost through diversity. In addition, a redundant array of inexpensive disks (RAID) group including a plurality of PDEVs 21 of the same type may be configured, and data may be stored according to a predetermined RAID level to optimize the failure tolerance and capacity according to a requirement.

The network 3 is, for example, a network for performing mutual communication among the connected host server 200, storage system 1, and management server 50, and for example, a local area network (LAN) is used. However, the network 3 may be logically configured by using a virtual network technology and may be configured by mixing different types of networks to suppress network installation cost, or to suppress complication of cable wiring by using a wireless technology.

The host server 200 is a device that is connected to the storage system 1 and performs storage access. Specifically, the host server 200 transmits a connection establishment/disconnection request with respect to the storage system 1, a setting change request, and a storage data input/output request (a data write request and a data read request).

The management server 50 is a personal computer (PC) or a server including a user interface such as a graphical user interface (GUI) or a command line interface (CLI), and provides a function for a user or the operator to control and monitor the storage system 1.

Figure 2:
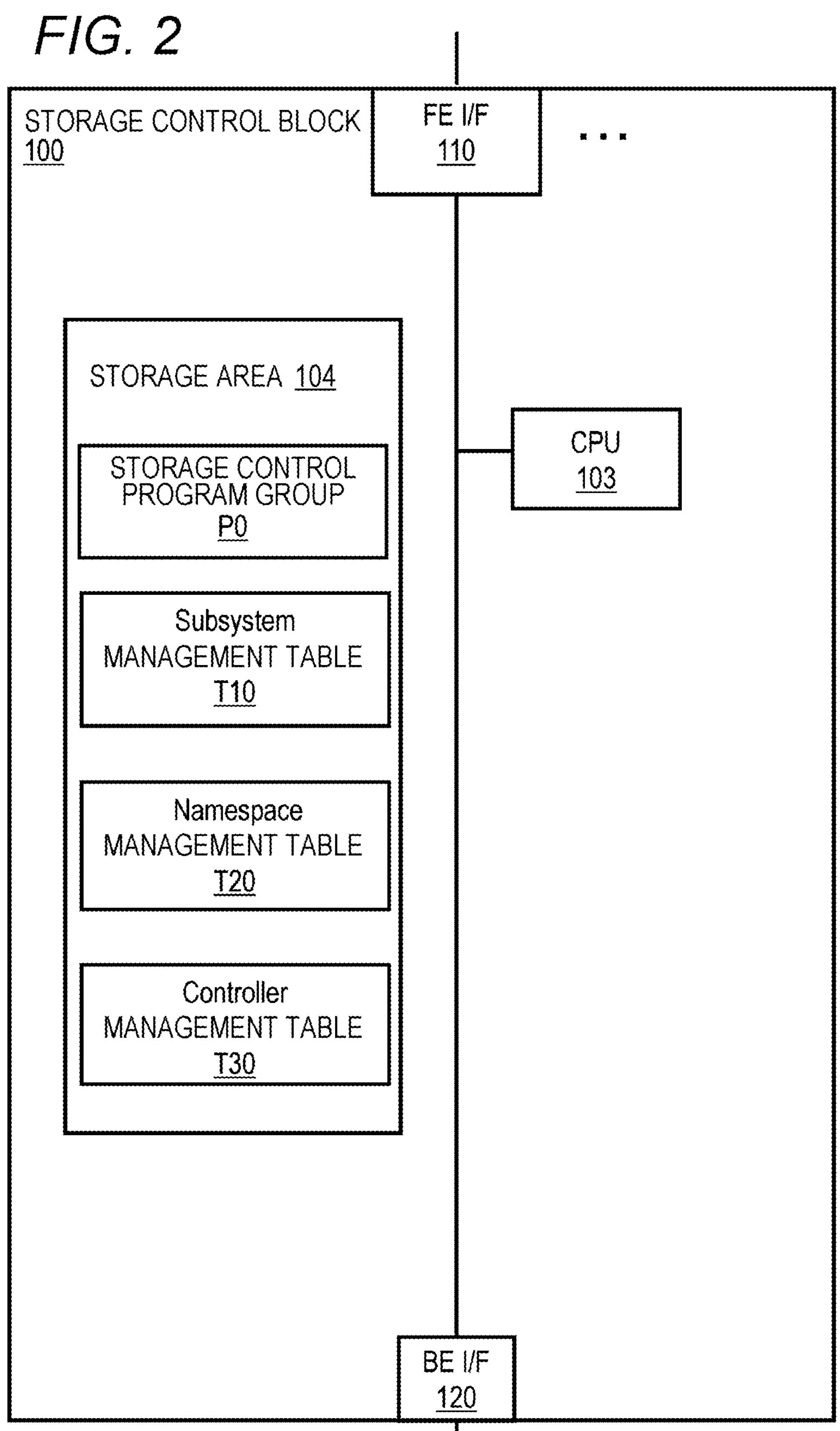
FIG. 2 is a configuration diagram of a storage control block.

FIG. 2 is a configuration diagram of the storage control block 100. The storage control block 100 includes the BE I/F 120, one or more FE I/Fs 110, a central processing unit (CPU) 103, and a storage area 104, which are connected to each other via a bus.

The BE I/F 120 and the FE I/F 110 correspond to input/output devices in a computer. The BE I/F 120 is an interface for communicating with the storage device unit 20. The FE I/F 110 is a SmartNIC which is a programmable network interface, on which a part of a storage protocol when the host server 200 accesses the storage system 1 operates.

In the present embodiment, Non-Volatile Memory Express over Transmission Control Protocol (NVMe over TCP) will be described as an example of the storage protocol, but a storage access method with optimized cost and access speed according to requirements of the information system may be selected using another storage protocol such as internet small computer system interface (iSCSI).

The storage system 1 treats a logical device (LDEV) obtained by bundling and cutting the physical devices (PDEV) with RAID or the like as a basic unit, and some terms of the NVMe in the present specification will be described. A Host is a side (corresponding to an initiator in the iSCSI) using the storage system 1, is uniquely specified by a Host ID, and has a name of Host NQN.

A Subsystem provides one or more devices in the storage system 1 (a storage server which corresponds to a target in the iSCSI). The Subsystem includes one or more Controllers and one or more Namespaces. The Subsystem is uniquely specified by a Subsystem ID and has a name of Subsystem NQN.

The Controller (NVMe controller) is an interface for accessing the Subsystem and is identified by a Controller ID. The Namespace is a logical device provided by the Subsystem and is identified by a Namespace ID. A Port (Fabric port) is a network interface for accessing the Controller, and is identified by a Port ID.

Association is a logical connection between the Host and the Subsystem. The Host accesses the Port to establish association with the Controller. When the Host accesses the Subsystem, one or more Namespaces identified by the Namespace ID, that is, the logical devices, can be referred to.

In the NVMe/TCP, a management queue connection and an arbitrary number of IO queue connections are established for access (Association) to one Subsystem. The queue connection is established first, and then the IO queue connection is established. The Namespace as an access destination is designated at the time of IO (Read/Write) access.

The storage area 104 stores a storage control program group P0 executed by the CPU 103 and management information managed by the storage control program group P0. The management information includes a Subsystem management table T10, a Namespace management table T20, and a Controller management table T30. Details of the management information and details of processing in the storage control block 100 are described below.

Figure 3:
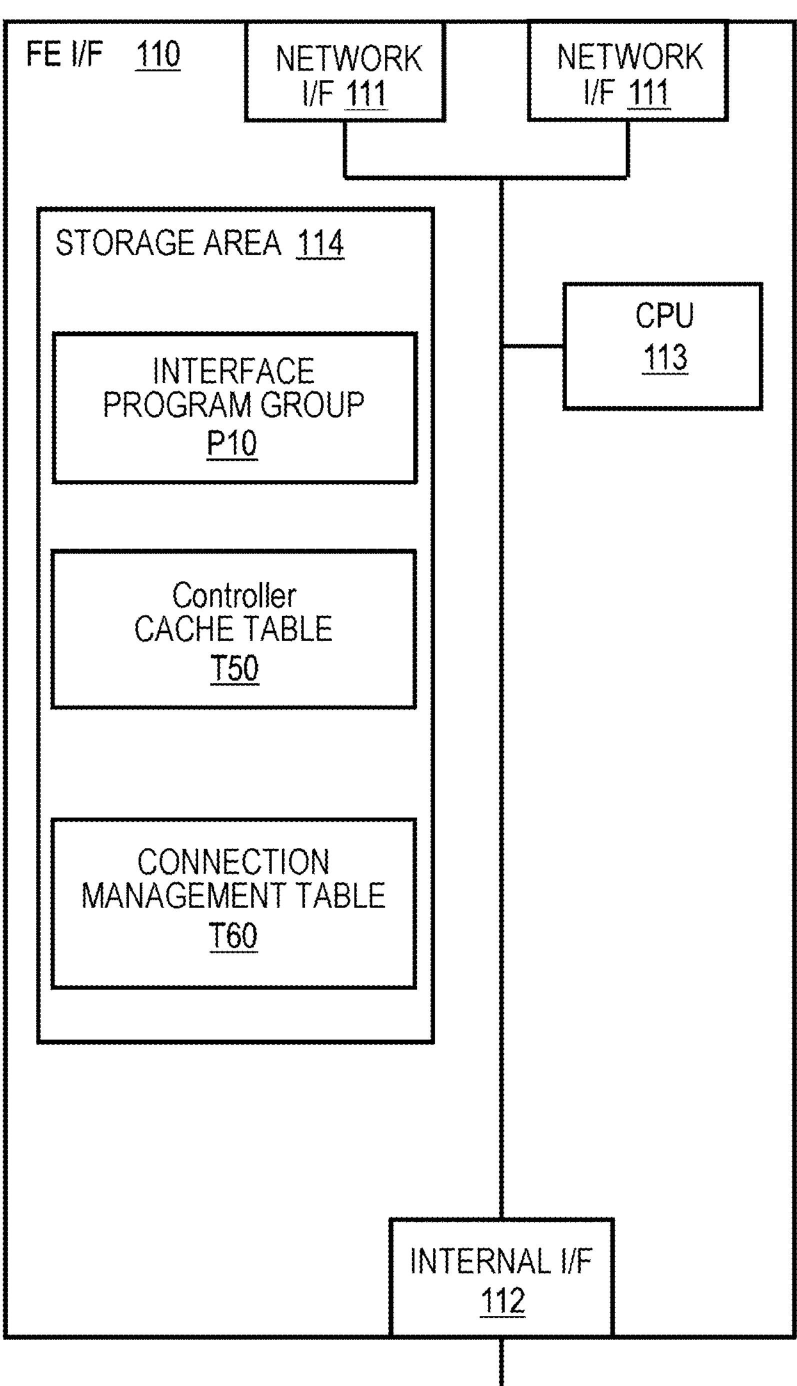
FIG. 3 illustrates a configuration example of a front-end interface (FE I/F)

FIG. 3 illustrates a configuration example of the FE I/F 110. In this example, the FE I/F 110 is a SmartNIC. The SmartNIC is a highly functional network card that can program (add) a function desired by the user by software or hardware, and is a front-end interface device. The SmartNIC can execute functions of a transport layer and an application layer, for example.

The following description of the SmartNIC can also be applied to an interface device having a programmable logic circuit configuration such as a field programmable gate array (FPGA) in addition to an interface device that can program a function by software executed by a processor. The FPGA may include a logic circuit that implements each function implemented by a program and a cache memory used in computation.

The FE I/F 110 includes a network I/F 111, an internal I/F 112, a CPU 113, and a storage area 114. The network I/F 111, the internal I/F 112, the CPU 113, and the storage area 114 are connected to each other by a communication path such as a bus.

The network I/F 111 is an interface device for communicating with the host server 200. The network I/F 111 is used as a network port (hereinafter, referred to as a port) for communication for which an IP address is set. The IP address is an identifier on the network, and the host server 200 communicates with the FE I/F 110 through the IP address set for the port.

The internal I/F 112 is an interface device that communicates with the storage control block 100. The internal I/F 112 is connected to the CPU or the like of the storage control block 100 by, for example, Peripheral Component Interconnect-Express (PCIe).

The CPU 113 controls an operation of the FE I/F 110. The storage area 114 stores a program and data used for operation control of the CPU 113. The storage area 114 stores an interface processing program group P10, a Controller cache table T50, and a connection management table T60.

The interface processing program group P10 is executed by the CPU 113 to control a connection for communication between the host server 200 and the storage system 1 and a session including one or more connections. In the present embodiment, Transmission Control Protocol/Internet Protocol (TCP/IP) connection is assumed as a connection type, and NVMe/TCP Association is assumed as a session.

The interface processing program group P10 configures, for each port of the FE I/F 110, a TCP port for a Listen service that accepts a connection request. The interface processing program group P10 establishes a TCP connection when a connection request for the Listen service is received, and then accepts a session request from the host server and establishes a session.

The interface processing program group P10 includes an operating system (OS) of the FE I/F 110, and communicates with the storage control block 100 to perform initialization, resource management, failure management, and task scheduling of the FE I/F 110.

The interface processing program group P10 receives various requests such as Read/Write from the host server 200 or the like, and processes a block protocol included in the request. The interface processing program group P10 processes a block access protocol such as the NVMe/TCP received from the host server 200, and converts the block access protocol into a block access command request for the storage control block 100. The interface processing program group P10 communicates with the storage control block 100, and performs processing such as data writing and reading on the LDEV constituting the Namespace of the Subsystem in response to the various requests described above.

Figure 4:
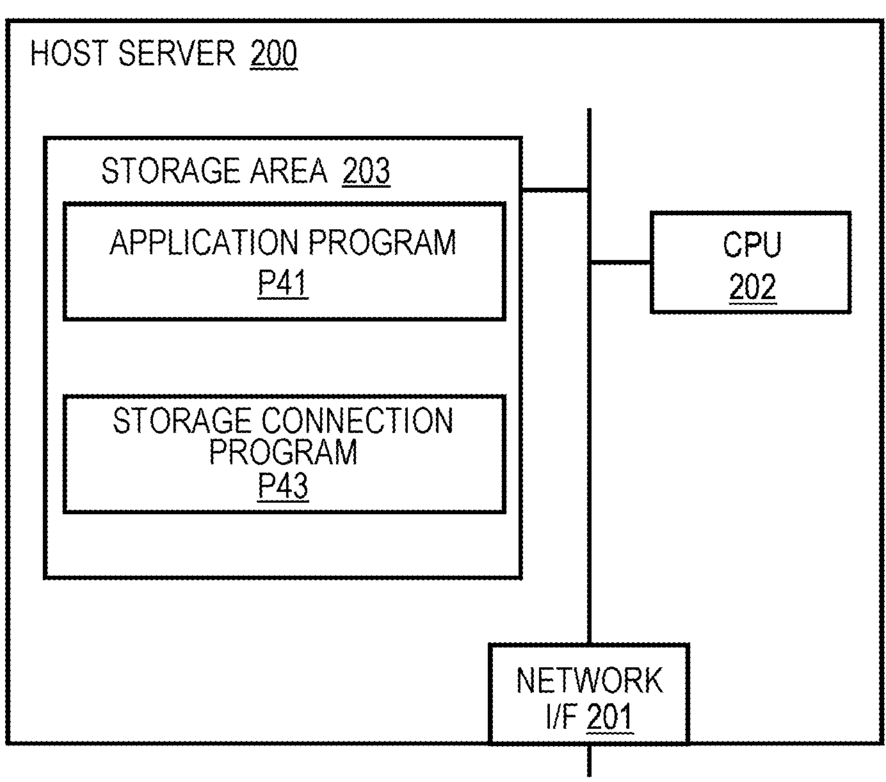
FIG. 4 is an example of a configuration diagram of a host server.

FIG. 4 is an example of a configuration diagram of the host server 200. The host server 200 includes a network I/F 201, a CPU 202, and a storage area 203. The network I/F 201, the CPU 202, and the storage area 203 are connected to each other by a communication path such as a bus.

The network I/F 201 is an interface device for communicating with the storage system 1 and the management server 50. The CPU 202 controls an operation of the host server 200. The storage area 203 stores a program and a table used for operation control of the CPU 202. The storage area 203 stores an application program P41 and a storage connection program P43. The storage area 203 also stores information used by the program.

The application program P41 is executed by the CPU 202 to read and write data in the Namespace of the Subsystem provided by the storage system 1 via the storage connection program P43. The storage connection program P43 receives various requests such as Read/Write from the application program P41 and reads/writes data from/to the storage system 1.

Figure 5:
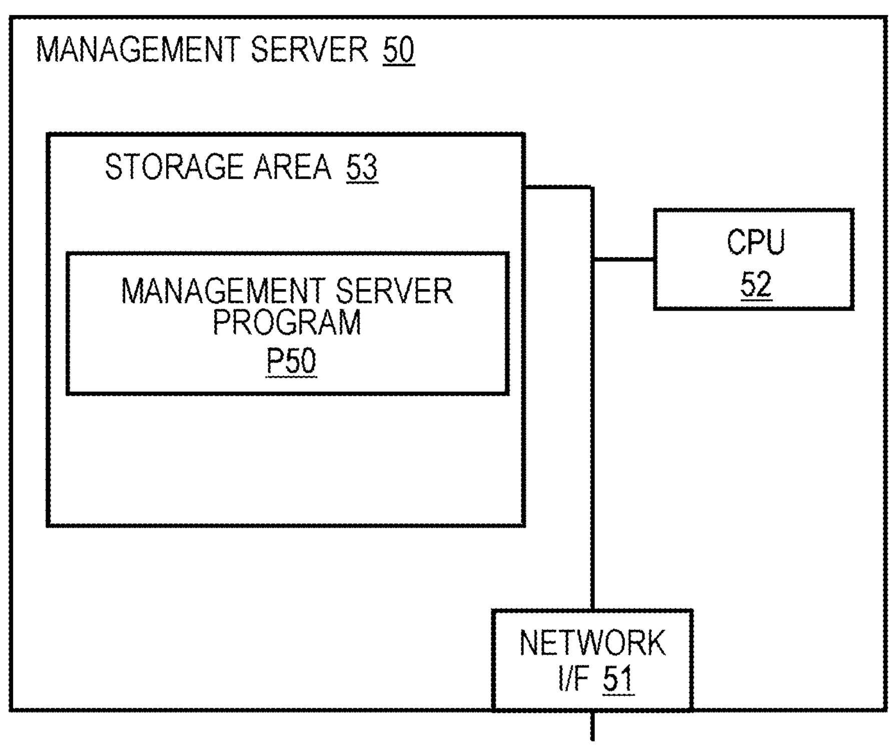
FIG. 5 is an example of a configuration diagram of a management server.

FIG. 5 is an example of a configuration diagram of the management server 50. The management server 50 includes a network I/F 51, a CPU 52, and a storage area 53. The network I/F 201, the CPU 202, and the storage area 203 are connected to each other by a communication path such as a bus. The network I/F 51 is an interface device for communicating with the storage system 1 and the host server 200.

The CPU 52 controls an operation of the management server 50. The storage area 53 stores a program and data used for operation control of the CPU 52. The storage area 53 stores a management server program P50. The management server program P50 includes a user interface such as a GUI or a CLI, and provides a function for the user or operator to control and monitor the storage system 1. When a control instruction or a monitoring instruction for the storage system 1 is received from the user, the management server program P50 communicates with the storage system 1 to perform control or monitoring.

Hereinafter, the management information held in the storage control block 100 will be specifically described. In the following description, the management information is expressed as a table, but an expression suitable for improving a function or performance such as failure tolerance, such as Key-Value, may be used. In addition, an expression in which a plurality of values is held in one field of one entry in a table is used in some cases, but table division or entry division may be performed to hold information in a plurality of tables or a plurality of entries, so that normalization according to performance and function requirements may be performed.

FIG. 6 illustrates a configuration example of the Subsystem management table T10. The Subsystem management table T10 associates the Subsystem with the Subsystem NQN and the port of the FE I/F 110. In the configuration example illustrated in FIG. 6, the Subsystem management table T10 includes a Subsystem ID field C101, a Subsystem NQN field C102, and a port ID field C103. The Subsystem ID field C101 stores an identifier of a corresponding Subsystem in the storage system 1. The Subsystem NQN field C102 indicates an NVMe qualified name (NQN) which is an identifier of the Subsystem in the NVMe/TCP protocol. The port ID field C103 indicates an identifier of the port of the FE I/F 110 for the host to access the Subsystem.

FIG. 7 illustrates a configuration example of the Namespace management table T20. Each Subsystem provides one or more Namespaces to the Host. Only one logical device (LDEV) is allocated to one Namespace. The Namespace management table T20 manages a relationship therebetween.

In the configuration example illustrated in FIG. 7, the Namespace management table T20 includes a Subsystem ID field C201, a Namespace ID field C202, and an LDEV ID field C203. Each entry indicates information of one Namespace. The Subsystem ID field C201 indicates an ID of the Subsystem having each Namespace. The Namespace ID field C202 indicates an ID for identifying a Namespace in the Subsystem. Each Namespace is identified in the storage system 1 by a combination of the Subsystem ID and the Namespace ID. The LDEV ID field C203 indicates an ID of the LDEV constituting each Namespace. In each Subsystem, the Namespace and the LDEV are in a one-to-one correspondence.

FIG. 8 illustrates a configuration example of the Controller management table T30. The Controller management table T30 is an interface for access from the host, and the Controller management table T30 manages information of the current Association. When the Association is made, a new entry is added, and the entry is deleted when the Association is terminated.

In the configuration example illustrated in FIG. 8, the Controller management table T30 includes a Controller ID field C301, a Subsystem ID field C302, a Port ID field C303, a Host NQN field C304, a Host ID field C305, a protocol field C306, a number of scheduled queues field C307, and a number of connections field C308. Each entry indicates information of one current Association.

The Controller ID field C301 indicates an ID of the Controller accessed by the host in the Association. The Controller ID identifies the Controller in the storage system 1. The Subsystem ID field C302 indicates an ID of the Subsystem including the Controller. The Port ID field C303 indicates an ID of the port of the FE I/F 110 as an access destination in the Association.

The Host NQN field C304 indicates an NQN of the host as an access source in the Association. The Host ID field C305 indicates an ID of the host as the access source in the Association. The protocol field C306 indicates a type of a communication protocol used in the Association. In this example, the NVMe/TCP is assumed. As another example, the FC-NVMe or the iSCSI may be used.

The number of scheduled queues field C307 indicates the maximum value of the number of IO queues in the Association. Since the IO queue is set for each IO queue connection (the management queue connection is not included), the number of scheduled queues corresponds to the number of scheduled IO queue connections. For example, a requested value from the host is set as the number of scheduled queues. An allowable maximum value is set in advance for the number of scheduled queues, and the number of scheduled queues in the Association may be set and registered within a range equal to or less than the allowable maximum value. The number of connections field C308 indicates the current number of IO queue connections in the Association. This value corresponds to the current number of IO queues in the Association.

Next, the management information held in the FE I/F 110 will be more specifically described. As illustrated in FIG. 3, the FE I/F 110 stores the Controller cache table T50 and the connection management table T60 in the storage area 114.

FIG. 9 illustrates a configuration example of the Controller cache table T50. The Controller cache table T50 includes cache data and additional information of the Controller management table T30 held and managed by the storage control block 100. The Controller cache table T50 may include only information of the Association that uses the port of the FE I/F 110 or may include information of the Association that uses the port of another FE I/F 110.

In the former case, resources and labor necessary for management can be saved because the number of management targets can be reduced. On the other hand, in the latter case, information necessary for processing such as redundancy or exclusion in cooperation with a plurality of FE I/Fs 110 can be confirmed without an additional inquiry, so that the processing can be simplified. In addition, since the Controller cache table T50 is a cache of information held by the storage control block 100, a part of or the entire Controller cache table T50 may be omitted, and computer resources required by the FE I/F 110 may be saved by inquiring the storage control block 100 about necessary information.

In the configuration example illustrated in FIG. 9, the Controller cache table T50 includes a Controller ID field C501, a Subsystem ID field C502, a Port ID field C503, a Host NQN field C504, a Host ID field C505, a protocol field C506, a number of scheduled queues field C507, a number of connections fields C508, and an available Namespace ID field C509.

Each entry indicates information of one current Association (session). Data in the fields C501 to C508 is a cache of data in the fields C301 to C308 having the same names in the Controller management table T30, and these pieces of data are the same as each other. Some pieces of data may be omitted in the cache of the Controller management table T30 held in the Controller cache table T50 illustrated in FIG. 9.

The available Namespace ID field C509 indicates an ID of the Namespace, that is, the LDEV, which can be accessed by the host in the Association. One Association enables access to one or more designated Namespaces (LDEVs). Information in the available Namespace ID field C509 is passed from the storage control block 100 to the FE I/F 110.

FIG. 10 illustrates a configuration example of the connection management table T60. The connection management table T60 manages TCP information of the Controller. Each entry indicates information of one connection. The connection management table T60 manages both the management queue connection and the IO queue connection. The connection management table T60 manages information of a connection via the FE I/F 110 holding the connection management table T60, and does not need to include information of other FE I/Fs 110. In the former case, resources and labor necessary for management can be saved because the number of management targets can be reduced. On the other hand, in the latter case, information necessary for processing such as redundancy or exclusion in cooperation with a plurality of FE I/Fs 110 can be confirmed without an additional inquiry, so that the processing can be simplified.

In the configuration example illustrated in FIG. 10, the connection management table T60 includes a connection ID field C601, a Controller ID field C602, a host IP address field C603, a host port number field C604, a target IP address field C605, a target port number field C606, a queue ID field C607, and a connection configuration field C608.

The connection ID field C601 is an identifier of an entry in the connection management table T60. The connection ID field C601 may be omitted. The Controller ID field C602 indicates the Controller ID in the Association including the connection.

The host IP address field C603 and the host port number field C604 indicate an IP address and a TCP port number of the host of the connection, respectively. These values are designated by the host. The target IP address field C605 and the target port number field C606 indicate an IP address and a TCP port number of the target. These values are set by the storage control block 100.

The queue ID field C607 indicates an ID of a queue allocated to the connection. "0" is set for a management queue, and an integer value of "1" or more is sequentially assigned to the IO queue. The connection configuration field C608 indicates configuration information for each connection. In this example, configuration information of a keepalive function, specifically, a KeepAliveTimeout time, is registered. The KeepAliveTimeout time is a time for waiting for the next new request without closing the connection after one request is completed, and a unit of the time is, for example, milliseconds.

The request may be limited to a specific request such as a KeepAlive command to facilitate understanding of processing. As another example of the connection configuration field C608, a processing priority of a corresponding connection with respect to another connection may be set such that only a specific connection can be prioritized or subordinated to enable resource use suitable for the request.

Hereinafter, processing in the storage control block 100 and the FE I/F 110 will be described. In the following description, the order of processing may be changed within a range in which consistency can be maintained, or the preceding and subsequent processing may be combined to simplify processing and reduce the number of communications.

As for a parameter used in the processing in the storage control block 100 and the FE I/F 110, in a case where the parameter is referred to as information exchanged between the storage control block 100 and the FE I/F 110, the information is used, and otherwise, information set in advance in the storage control block 100 and the FE I/F 110 is used. Some or all of parameters included in the information exchanged through communication may be set in advance in the storage control block 100 and the FE I/F 110 to save communication and processing. Conversely, information may be added to communication to reduce the number of parameters to be set in advance, thereby facilitating setting change.

Figure 11:
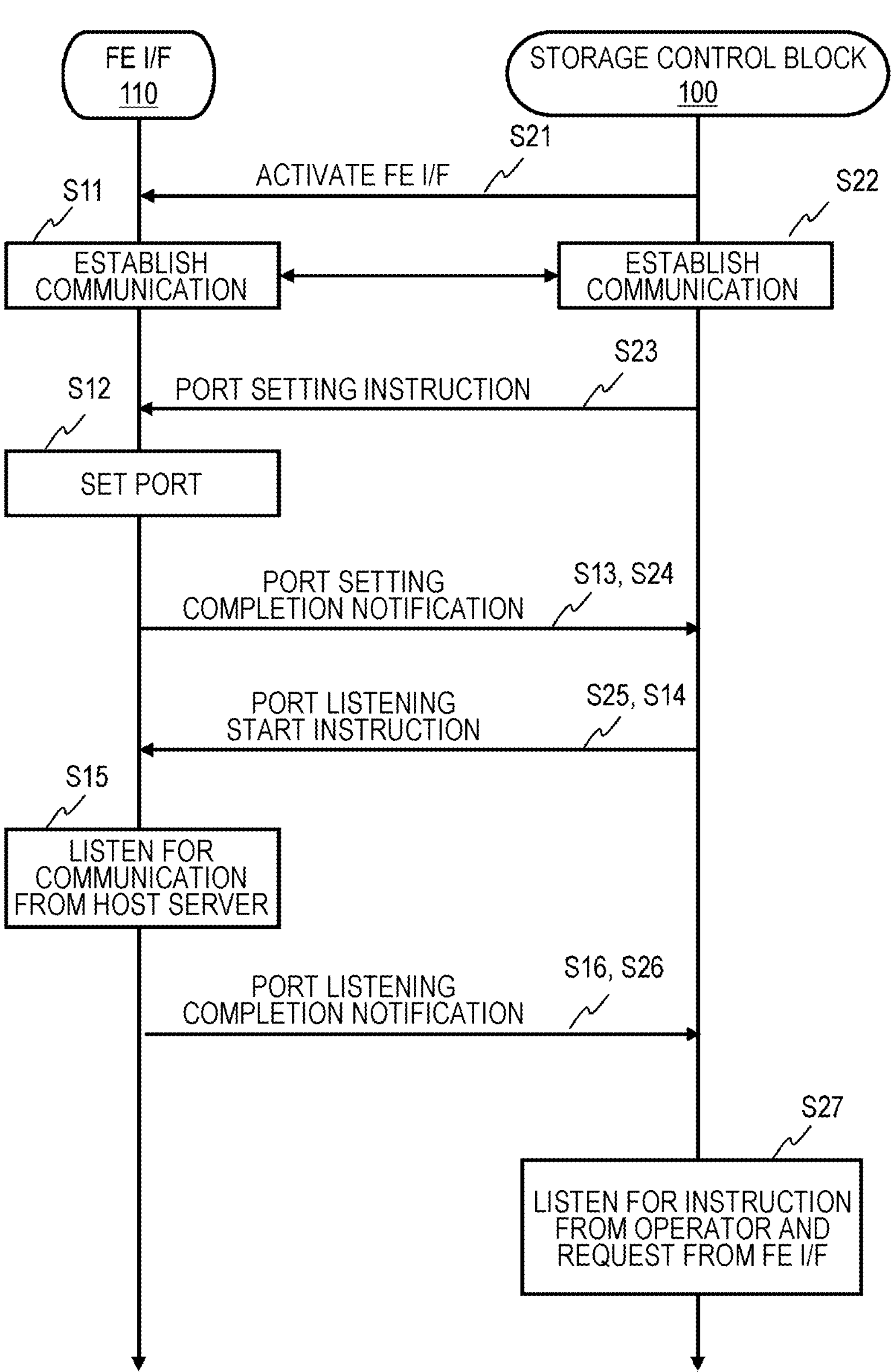
FIG. 11 is a sequence diagram of initialization processing.

First, initialization processing in the storage control block 100 and the FE I/F 110 will be described. FIG. 11 is a sequence diagram of the initialization processing, FIG. 12 is a flowchart of initialization processing in the FE I/F 110, and FIG. 13 is a flowchart of initialization processing in the storage control block 100.

Figure 13:
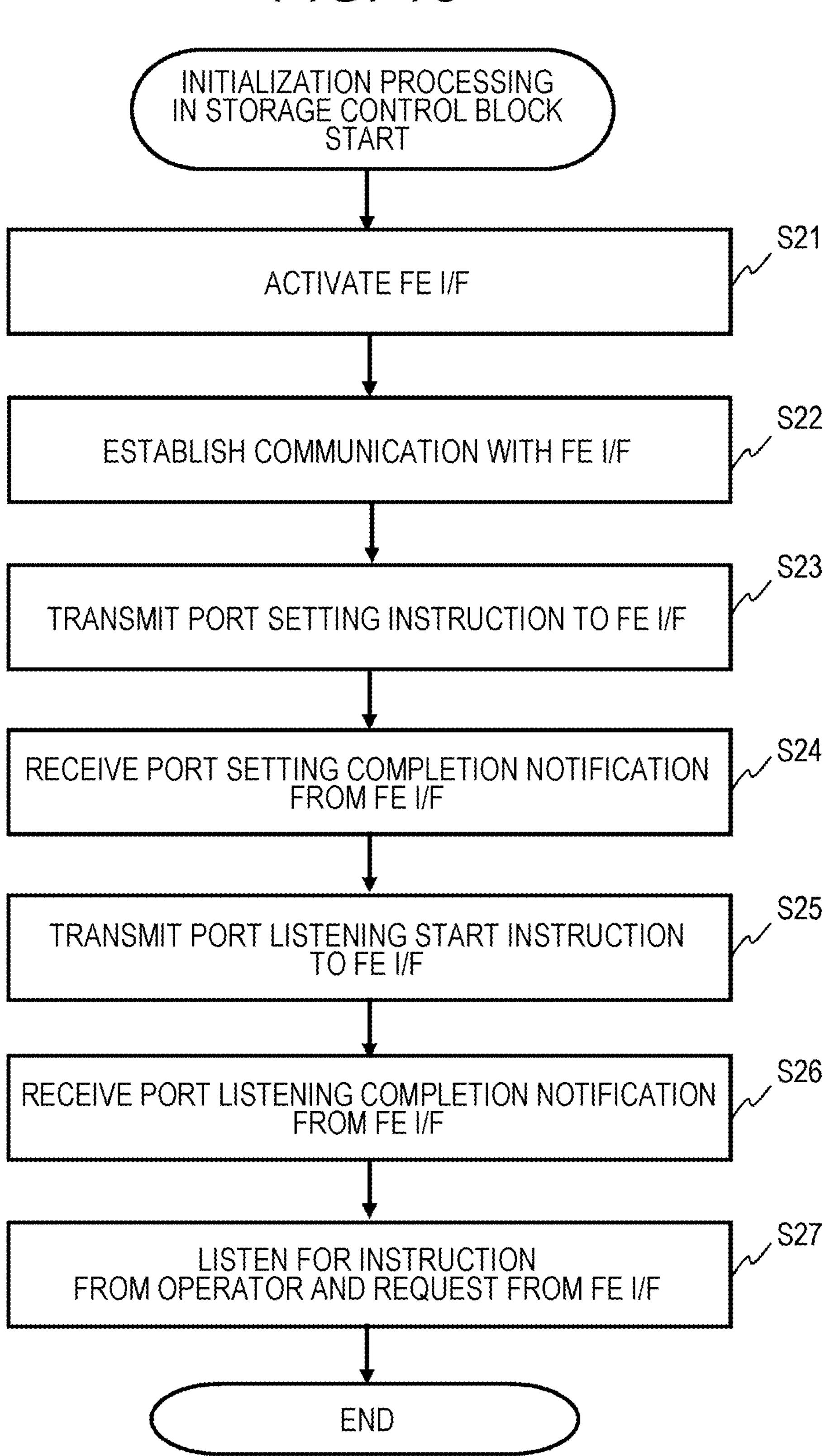
FIG. 13 is a flowchart of initialization processing in a storage control block.

Before starting the initialization processing illustrated in FIGS. 11 to 13, the storage control block 100 creates the Subsystem management table T10 and the Namespace management table T20 in advance according to a design or a setting made by the operator. In addition, the FE I/F 110 is configured in advance for initializing communication with the storage control block 100 according to a design or initial setting.

As illustrated in FIGS. 11 and 13, the storage control block 100 activates the FE I/F 110 (S21). The activation of the FE I/F 110 is performed, for example, by supplying power. Next, as illustrated in FIG. 11, the activated FE I/F 110 and the storage control block 100 establish communication therebetween (S11 and S22). That is, as illustrated in FIG. 12, the activated FE I/F 110 establishes communication with the storage control block 100 (S11), and as illustrated in FIG. 13, the storage control block 100 establishes communication with the activated FE I/F 110 (S22).

Next, as illustrated in FIGS. 11 and 13, the storage control block 100 transmits a port setting instruction to the FE I/F 110 (S23). The port setting instruction designates the IP address and the TCP port number of each port of the FE I/F 110. As illustrated in FIGS. 11 and 12, the FE I/F 110 receives the port setting instruction from the storage control block 100, and sets the IP address and the TCP port number of each port (S12).

When the port setting is completed, the FE I/F 110 transmits a port setting completion notification to the storage control block 100 (S13).

As illustrated in FIGS. 11 and 13, after receiving the port setting completion notification from the FE I/F 110 (S24), the storage control block 100 transmits a port listening start instruction to the FE I/F 110 (S25).

As illustrated in FIGS. 11 and 12, the FE I/F 110 receives the port listening start instruction from the storage control block 100 (S14), and listens for communication from the host server (S15). For example, the FE I/F 110 activates NVMe/TCP target software. Thereafter, the FE I/F 110 transmits a port listening completion notification to the storage control block 100 (S16).

As illustrated in FIGS. 11 and 13, the storage control block 100 receives the port listening completion notification from the FE I/F 110 (S26), and listens for an instruction from the operator and a request from the FE I/F 110 (S27).

Next, connection establishment processing between the host server 200 and the storage control block 100 will be described. In the NVMe/TCP, the host server 200 and the storage system 1 establish a management queue connection and an arbitrary number of IO queue connections for access (Association) to one Subsystem. The management queue connection is established first, and then some IO queue connections are established. The Namespace (LDEV) as the access destination is designated at the time of IO (Read/Write) access.

FIG. 14 is a sequence diagram of management queue connection establishment processing. FIG. 14 illustrates a processing sequence in a case where no error occurs during the processing. First, the FE I/F 110 receives a connection request from the host server 200 (S31). The connection request includes information stored in the connection management table T60 and information stored in the Controller cache table T50.

For example, the information for the connection management table T60 can include the queue ID, the host IP address, the host port number, and the connection configuration information. The Controller ID is omitted in the case of a management queue connection request. The queue ID is "0" in the case of the management queue connection. The connection configuration information indicates the KeepAliveTimeout time. The target IP address and the target port number can be acquired by the FE I/F 110 from the storage control block 100.

The information for the Controller cache table T50 can include the Subsystem NQN, the Host NQN, the Host ID, the requested value of the number of scheduled queues, and the number of connections (the current number of IO queues). In the case of the management queue connection, the number of connections is "0". The Port ID is held as a set value in the FE I/F 110.

Next, the FE I/F 110 adds an entry to the connection management table T60 (S32). At this time, a value (for example, 0xffff) indicating no input is set as the Controller ID. Further, the FE I/F 110 transmits a Controller addition request to the storage control block (S33).

The Controller addition request includes information stored in the Controller management table T30. Specifically, the Controller addition request includes information including the Subsystem NQN, the Port ID, the Host NQN, the Host ID, the protocol, the number of scheduled queues, and the number of connections. In the case of the management queue connection, the number of connections is "0". In addition, the protocol indicates a communication protocol between the host server 200 and the FE I/F, and in this example, the NVMe over TCP is assumed.

Upon receiving the Controller addition request, the storage control block 100 adds a new entry to the Controller management table T30, secures a hardware resource such as a memory area or a CPU core, and sets the Controller ID (S34).

The storage control block 100 searches the Subsystem management table T10 for an entry whose Subsystem NQN matches the Subsystem NQN included in the Controller addition request, acquires the Subsystem ID of the corresponding entry, and sets the Subsystem ID in the Controller management table T30. As described above, the set protocol is the NVMe over TCP, and the number of connections set for the management queue connection is 0. The requested value is set as the number of scheduled queues. In a case where the requested value is larger than the preset allowable maximum value, the allowable maximum value may be set.

In the present specification, as described above, searching for an entry of which a value of a specific field (in the above example, the Subsystem NQN) matches a value (in the above example, the Subsystem NQN included in the Controller addition request) given by the same name in a specific table (in the above example, the Subsystem management table T10) and acquiring a value of another field (in the above example, the Subsystem ID) of the entry is simply expressed as acquiring another value from the specific table by using the value of the specific field (in the above example, the Subsystem ID is acquired from the Subsystem management table T10 by using the Subsystem NQN) or acquiring another value by searching for the value of the specific field from the specific table (in the above example, the Subsystem NQN is searched from Subsystem management table T10, and the Subsystem ID is acquired).

Next, the storage control block 100 searches the Namespace management table T20 for an entry whose Subsystem ID matches the Subsystem ID described above, and acquires the Namespace ID of the matching entry as an available Namespace ID list (S35). Next, the storage control block 100 transmits a Controller addition response including specific information to the FE I/F 110 (S36).

The Controller addition response includes the Controller ID, the set number of scheduled queues, and the available Namespace ID list. The Namespace ID list may be defined as a sequential series starting from 1, for example, and the number of Namespace IDs may be returned to reduce a communication data amount.

Upon receiving the response from the storage control block 100, the FE I/F 110 adds an entry to the Controller cache table (S37), and sets the Controller ID of the entry added to the Controller cache table T50 for the corresponding entry of the connection management table T60 (S38).

The FE I/F 110 prepares the hardware resource such as the memory area or the CPU core necessary for processing in the management queue connection (S39), and returns a connection completion response to the host server 200 (S40). The connection complete response includes the set Controller ID, the set number of schedule queues, and the available Namespace ID list. In a case where an error occurs during the processing, an error response is transmitted to the host server 200. In addition, the management queue connection may be established a plurality of times. In this case, the management queue connection is treated as different Association, and is managed as a connection with a different Controller ID.

Figure 15:
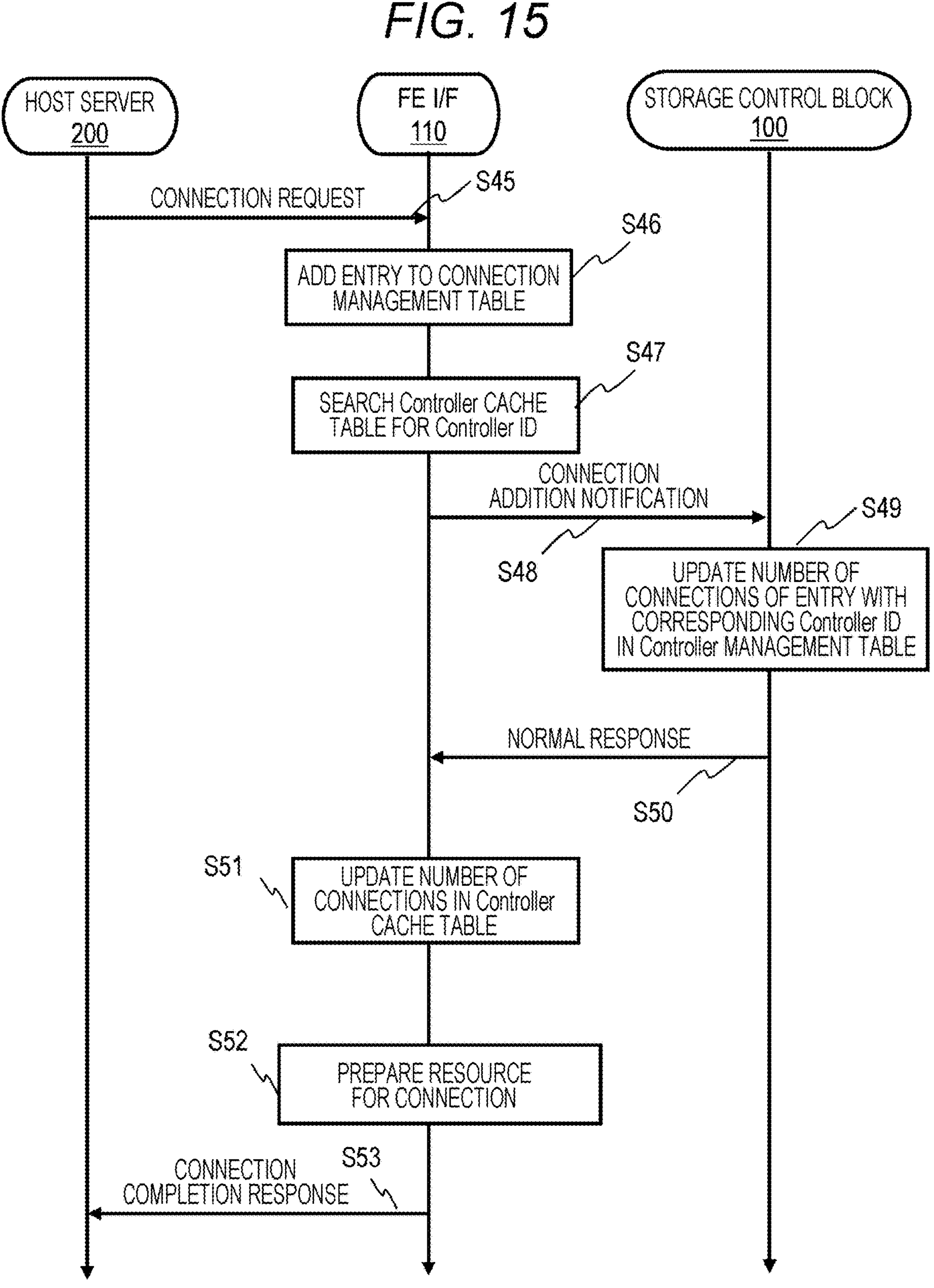
FIG. 15 is a sequence diagram of input/output (IO) queue connection establishment processing.

FIG. 15 is a sequence diagram of IO queue connection establishment processing belonging to the corresponding Association after the management queue connection is established. FIG. 15 illustrates a processing sequence in a case where no error occurs during the processing. First, the FE I/F 110 receives a connection request from the host server 200 (S45). The connection request includes information stored in the connection management table T60 and information stored in the Controller cache table T50.

For example, the information for the connection management table T60 can include the Controller ID, the queue ID, the host IP address, the host port number, and the connection configuration information. A value returned at the time of establishment of the management queue connection is used as the Controller ID. The queue ID is an integer value of "1" or more in the case of the IO queue connection. The connection configuration information indicates the requested KeepAliveTimeout time. The target IP address and the target port number can be acquired by the FE I/F 110 from the storage control block 100.

The information for the Controller cache table T50 can include the Controller ID. The corresponding Association can be specified by searching for an entry of the Controller cache table T50 that matches the Controller ID indicated from the host.

Next, the FE I/F 110 adds an entry to the connection management table T60 (S46). Next, the FE I/F 110 searches the Controller cache table T50 for the designated Controller ID (S47).

When an entry whose Controller ID matches exists in the Controller cache table T50, the FE I/F 110 further transmits a connection addition request to the storage control block 100 (S48). The connection addition request includes information regarding the number of connections in addition to the Controller ID. The number of connections is set to a value obtained by adding 1 to the number of connections of the entry whose Controller ID matches. In a case where the entry does not exist or the current number of connections exceeds the number of scheduled queues, it is determined that an error has occurred.

Upon receiving the connection addition request, the storage control block 100 searches the Controller management table T30 for the corresponding entry with the Controller ID, and updates the number of connections of the entry with the corresponding Controller ID to a value of the number of connections included in the connection addition request from the FE I/F 110 (S49). Thereafter, the storage control block 100 returns a normal response (S50). In a case where the entry does not exist or the number of connections exceeds the number of scheduled queues by the current IO queue connection, an error response is returned.

Upon receiving the normal response from the storage control block 100, the FE I/F 110 updates the number of connections in the Controller cache table T50 so as to match the Controller management table T30 (S51).

The FE I/F 110 prepares a hardware resource such as the memory area or the CPU core for the management queue connection (S52), and returns a connection completion response to the host server 200 (S53). The connection completion response includes the Controller ID. In a case where an error occurs during the processing, an error response is transmitted to the host server 200.

Figure 16A:
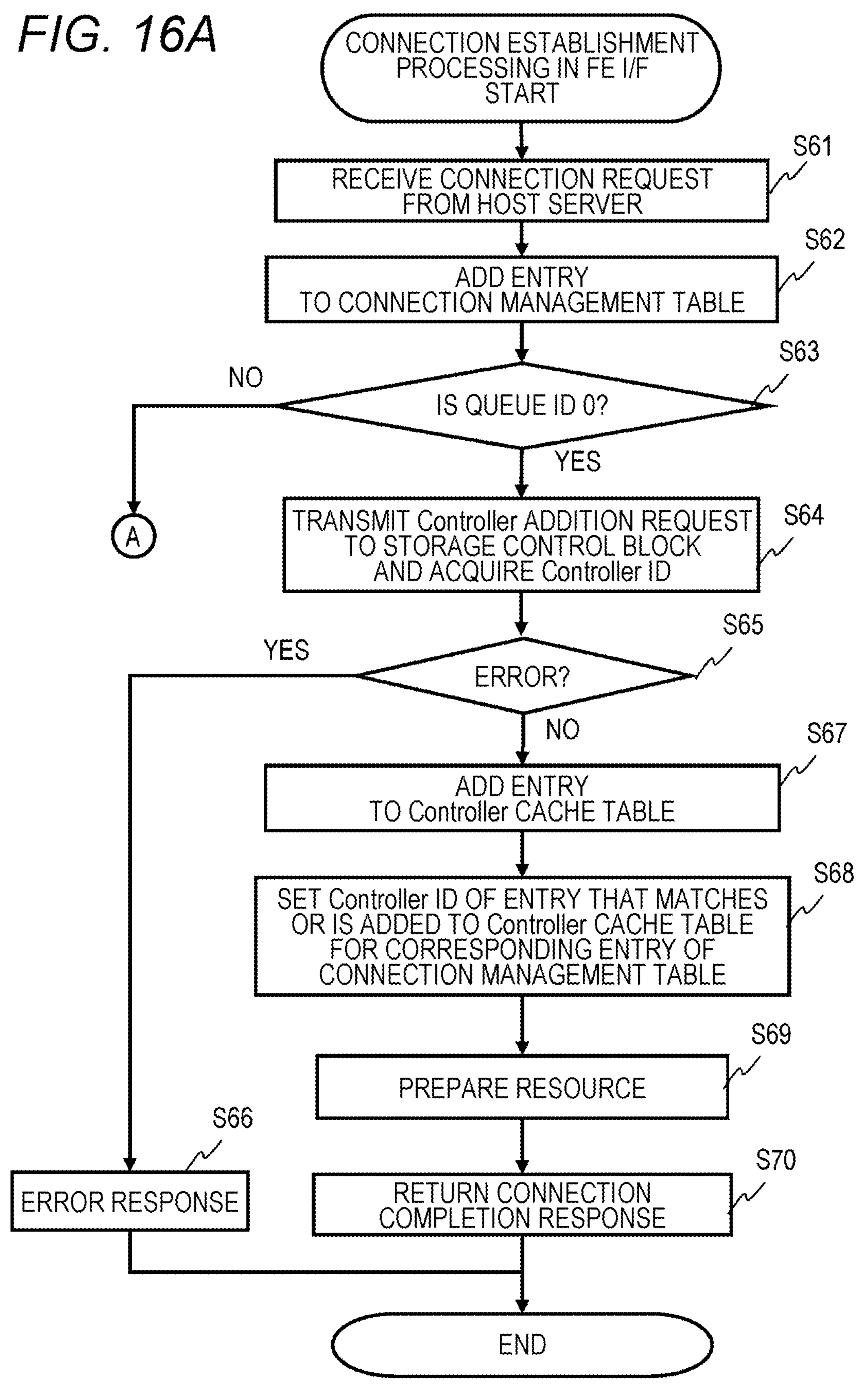
FIG. 16A is a flowchart of connection establishment processing in the FE I/F.
Figure 16B:
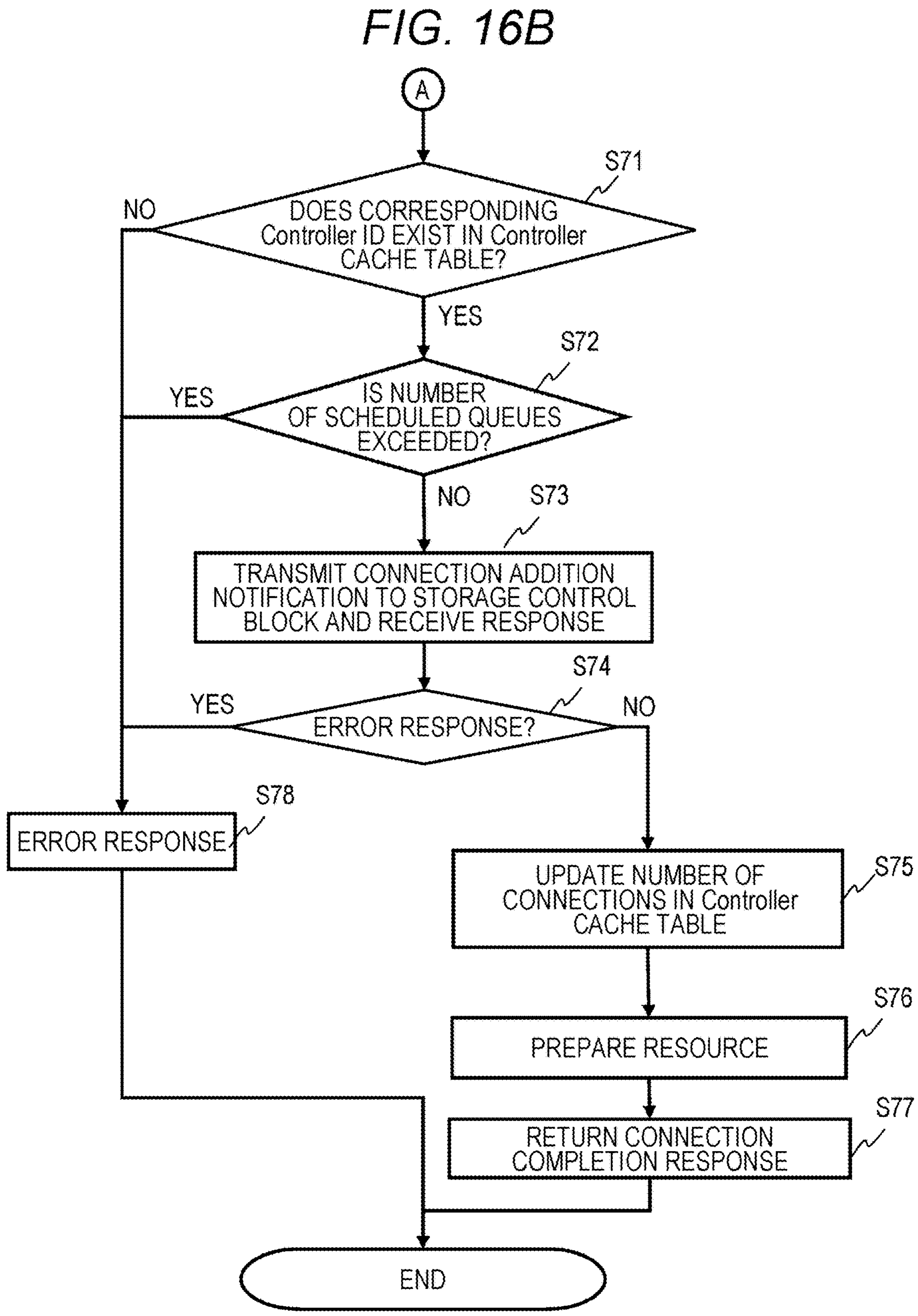
FIG. 16B is a flowchart of connection establishment processing in the FE I/F.

Next, processing in each of the FE I/F 110 and the storage control block 100 in the connection establishment processing described with reference to FIGS. 14 and 15 will be described with reference to a flowchart. In the following description, the same steps as those in FIGS. 14 and 15 are denoted by different reference numerals. FIGS. 16A and 16B are flowcharts of connection establishment processing in the FE I/F 110.

The FE I/F 110 receives a connection request for the management queue connection or the IO queue connection from the host server 200 (S61). Information included in the connection request is as described above.

Next, the FE I/F 110 adds a corresponding entry to the connection management table T60 (S62). At this time, the Controller ID is not input. Next, the FE I/F 110 determines whether or not the queue ID of the connection request is "0" (S63). If the queue ID is "0", the connection request is a request for the management queue connection, and if the queue ID is an integer larger than 0, the connection request is a request for the IO queue connection.

In a case where the queue ID is "0", that is, in a case where the connection request is a request for the management queue connection (S63: YES), the FE I/F 110 transmits a Controller addition request to the storage control block 100, and receives a Controller addition response including the Controller ID from the storage control block 100 (S64). Information included in the Controller addition request and the Controller addition response is as described with reference to FIG. 14.

In a case where the Controller addition response is an error response (S65: YES), the FE I/F 110 returns the error response to the host server 200 (S66). In a case where the Controller addition response is not an error response (S65: NO), the FE I/F 110 adds an entry to the Controller cache table T50 (S67).

Further, the FE I/F 110 sets the Controller ID of the entry added to the Controller cache table T50 for the corresponding entry of the connection management table T60 (S68). The FE I/F 110 prepares a hardware resource such as the memory area or the CPU core for the management queue connection (S69), and returns a connection completion response to the host server 200 (S70). Information included in the connection completion response is as described with reference to FIG. 14.

In step S63, in a case where the queue ID is an integer larger than "0", that is, in a case where the connection request is a request for the IO queue connection (S63: NO), the processing proceeds to step S71 of FIG. 16B via a connector A. In step S71, the FE I/F 110 searches the Controller cache table T50 for the Controller ID.

In a case where the corresponding Controller ID does not exist (S71: NO), the FE I/F 110 returns an error response to the host server 200 (S78). In a case where the corresponding Controller ID exists in the Controller cache table T50 (S71: YES), the FE I/F 110 determines whether or not a value obtained by adding 1 to the number of connections (the current number of IO queues) indicated by the connection request exceeds the number of scheduled queues (S72).

In a case where the value obtained by adding 1 to the number of connections indicated by the connection request exceeds the number of scheduled queues (S72: YES), the FE I/F 110 returns an error response to the host server 200 (S78). Disconnection processing triggered by the storage system described below may be performed. In a case where the value obtained by adding 1 to the number of connections indicated by the connection request is equal to or less than the number of scheduled queues (S72: NO), the FE I/F 110 transmits a connection addition notification to the storage control block 100 and receives a response thereto (S73).

In a case where an error response is received from the storage control block 100 (S74: YES), the FE I/F 110 returns the error response to the host server 200 (S78). In a case where a normal response is received from the storage control block 100 (S74: NO), the FE I/F 110 updates the number of connections in the Controller cache table T50 (S75).

Next, the FE I/F 110 prepares a hardware resource such as the memory area or the CPU core for the management queue connection (S76), and returns a connection completion response to the host server 200 (S77). Information included in the connection completion response is as described with reference to FIG. 15.

Next, processing in the storage control block 100 will be described. FIG. 17 is a flowchart of connection establishment processing in the storage control block 100. Reference numerals in FIG. 17 partially overlap the reference numerals in FIG. 16B, but in FIGS. 17 and 16B, the same reference numerals denote different steps from each other. The storage control block 100 receives a request from the FE I/F 110 (S75), and determines whether the request is a Controller addition request or a connection addition notification (S76). Information included in each addition request is as described with reference to FIGS. 14 and 15.

In a case where the received request is the Controller addition request (S76: Controller addition request), the storage control block 100 searches the Subsystem management table T10 for an entry whose Subsystem NQN matches the Subsystem NQN included in the Controller addition request, and acquires the Subsystem ID of the corresponding entry (S77).

Next, the storage control block 100 adds a new entry to the Controller management table T30, secures a hardware resource such as the memory area or the CPU core, and sets the Controller ID (S78). A protocol at this time is assumed to be the NVMe over TCP. The storage control block 100 sets "0" as the number of connections and sets the requested value as the number of scheduled queues. However, in a case where the requested value is larger than the allowable maximum value, the allowable maximum value may be set.

Next, the storage control block 100 searches the Namespace management table T20 for a corresponding Subsystem ID and acquires the available Namespace ID list (S79). Next, the storage control block 100 returns a Controller addition response to the FE I/F 110 (S80). The Controller addition response includes the Controller ID, the set number of scheduled queues, and the available Namespace ID list.

In step S76, in a case where the received request is the connection addition request (S76: connection addition request), the storage control block 100 searches the Controller management table T30 for an entry with the corresponding Controller ID (S81). In a case where the entry does not exist (S82: NO), the storage control block 100 returns an error response to the FE I/F 110 (S87).

In a case where the entry exists (S82: YES), the storage control block 100 compares the number of scheduled queues of the entry with the number of connections (the current number of IO queues) indicated by the request from the FE I/F 110 (S83). In a case where a value obtained by adding 1 to the number of connections exceeds the number of scheduled queues, that is, in a case where the number of IO queues exceeds the number of scheduled queues due to the current IO queue connection (S84: YES), the storage control block 100 returns an error response to the FE I/F 110 (S87).

In a case where the number of IO queues does not exceed the number of scheduled queues due to the current IO queue connection (S84: NO), the storage control block 100 updates the number of connections of the corresponding entry in the Controller management table T30 to a value obtained by adding 1 to the number of connections (S85), and returns a normal response to the FE I/F 110 (S86).

Figure 18:
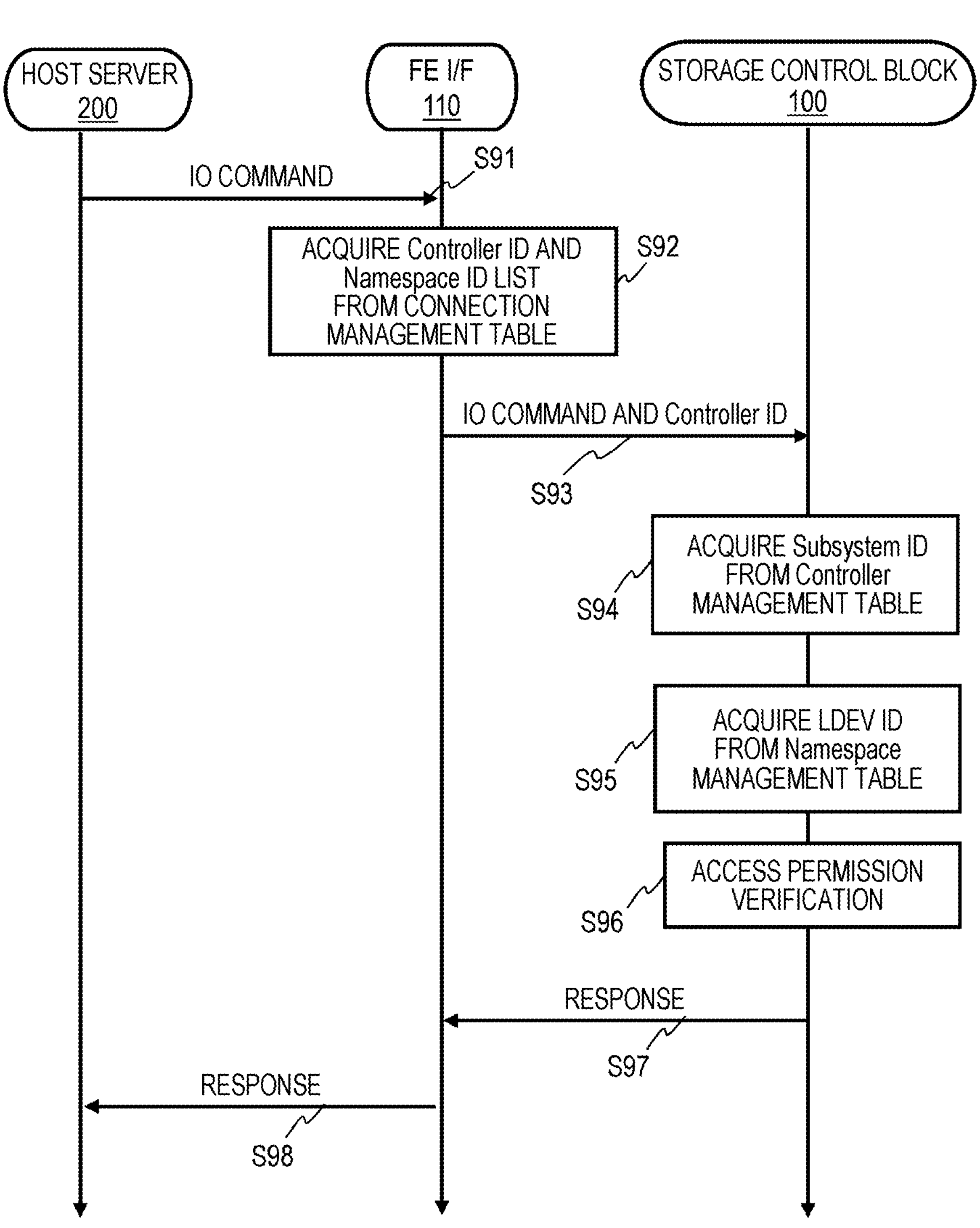
FIG. 18 is a sequence diagram of IO access processing.

Next, processing in the storage system 1 for IO access (read access or write access) from the host server 200 will be described. FIG. 18 is a sequence diagram of IO access processing.

The FE I/F 110 receives an IO command from the host server 200 (S91). The IO command is a read command or a write command. The IO command includes a command type (read or write), the Namespace ID, an access destination address, an access destination size, and write data in the case of the write command.

The FE I/F 110 acquires the Controller ID and the Namespace ID list corresponding to the IO command from the connection management table T60 (S92). The FE I/F 110 adds the acquired Controller ID and transfers the IO command to the storage control block 100 (S93).

Upon receiving the Controller ID and the IO command from the FE I/F 110, the storage control block 100 acquires the corresponding Subsystem ID from the Controller management table T30 (S94). Further, the storage control block 100 searches the Namespace management table T20 for a combination of the Subsystem ID and the Namespace ID to acquire the corresponding LDEV ID (S95).

Next, the storage control block 100 performs access permission verification on the access destination address and the access destination size (S96). The verification is general storage access control for determining user authority or whether another host server is using.

Next, the storage control block 100 returns a response to the FE I/F 110 (S97). In a case where a result of the access permission verification indicates an error, an error response is returned. In a case where the result of the access permission verification does not indicate an error, read data is returned in response to the read command, and a success response is returned in response to the write command.

The FE I/F 110 receives the response from the storage control block 100 and transfers the response to the host server 200 (S98).

The host server 200 may transmit the write command including no write data to the FE I/F 110, and may transmit the write command including the write data after receiving a writable response. In this case, the above-described sequence is performed twice.

Next, processing in each of the FE I/F 110 and the storage control block 100 in the IO access processing described with reference to FIG. 18 will be described with reference to flowcharts. In the following description, the same steps as those in FIG. 18 are denoted by different reference numerals.

Figure 19:
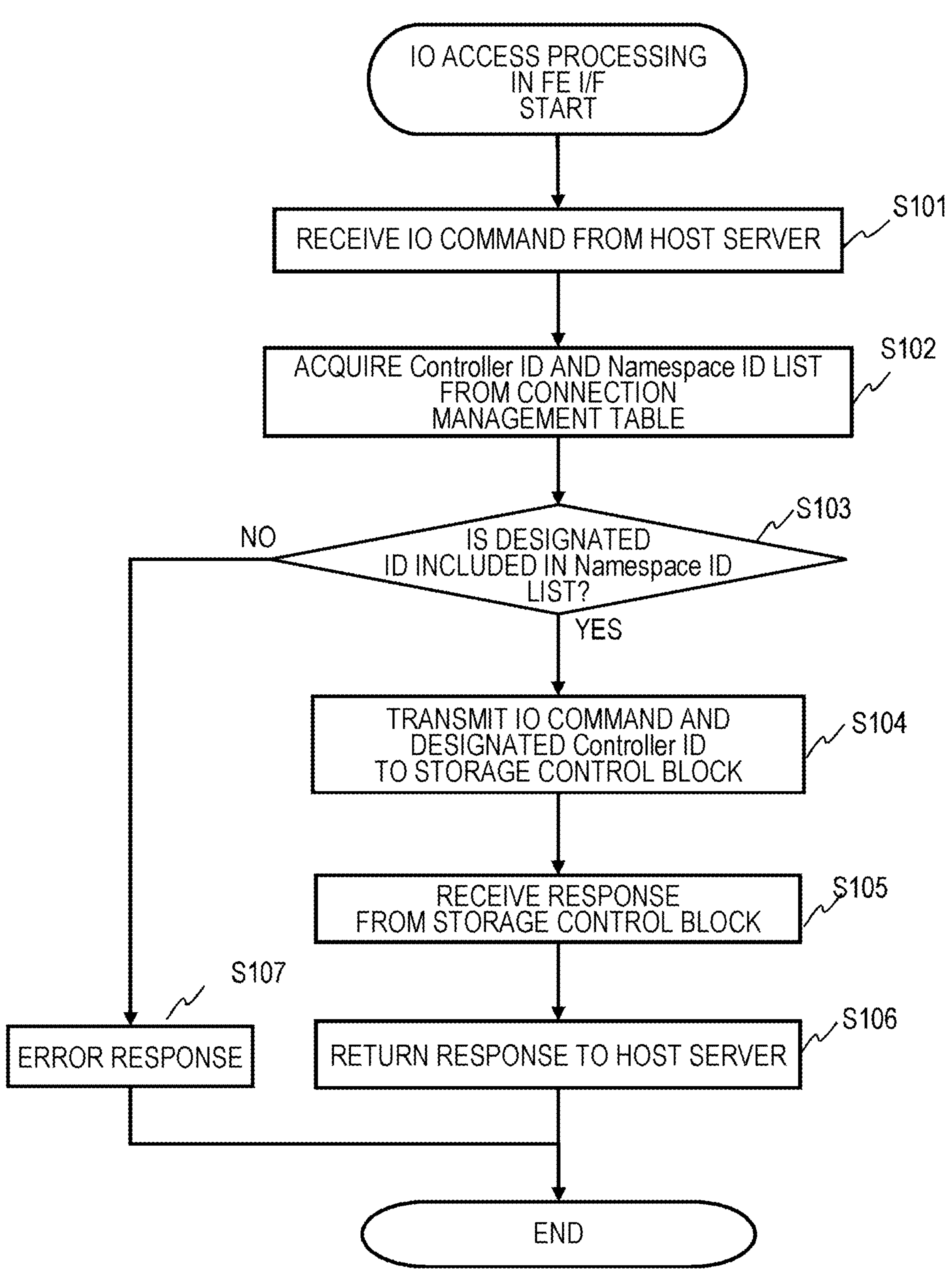
FIG. 19 is a flowchart of IO access processing in the FE I/F.

FIG. 19 is a flowchart of IO access processing in the FE I/F 110. First, the FE I/F 110 receives an IO command from the host server (S101). Information included in the IO command is as described with reference to FIG. 18. Next, the FE I/F 110 acquires the Controller ID and the Namespace ID list corresponding to the IO command from the connection management table T60 (S102).

In a case where the Namespace ID of the IO command is not included in the acquired Namespace ID list (S103: NO), the FE I/F 110 returns an error response to the host server 200 (S107).

In a case where the Namespace ID of the IO command is included in the acquired Namespace ID list (S103: YES), the FE I/F 110 transmits the acquired Controller ID and the IO command to the storage control block 100 (S104). Thereafter, the FE I/F 110 receives a response from the storage control block 100 (S105), and returns the response to the host server 200 (S106). As described above, the response is an error response or a normal read or write response. The normal read response includes the read data.

Figure 20:
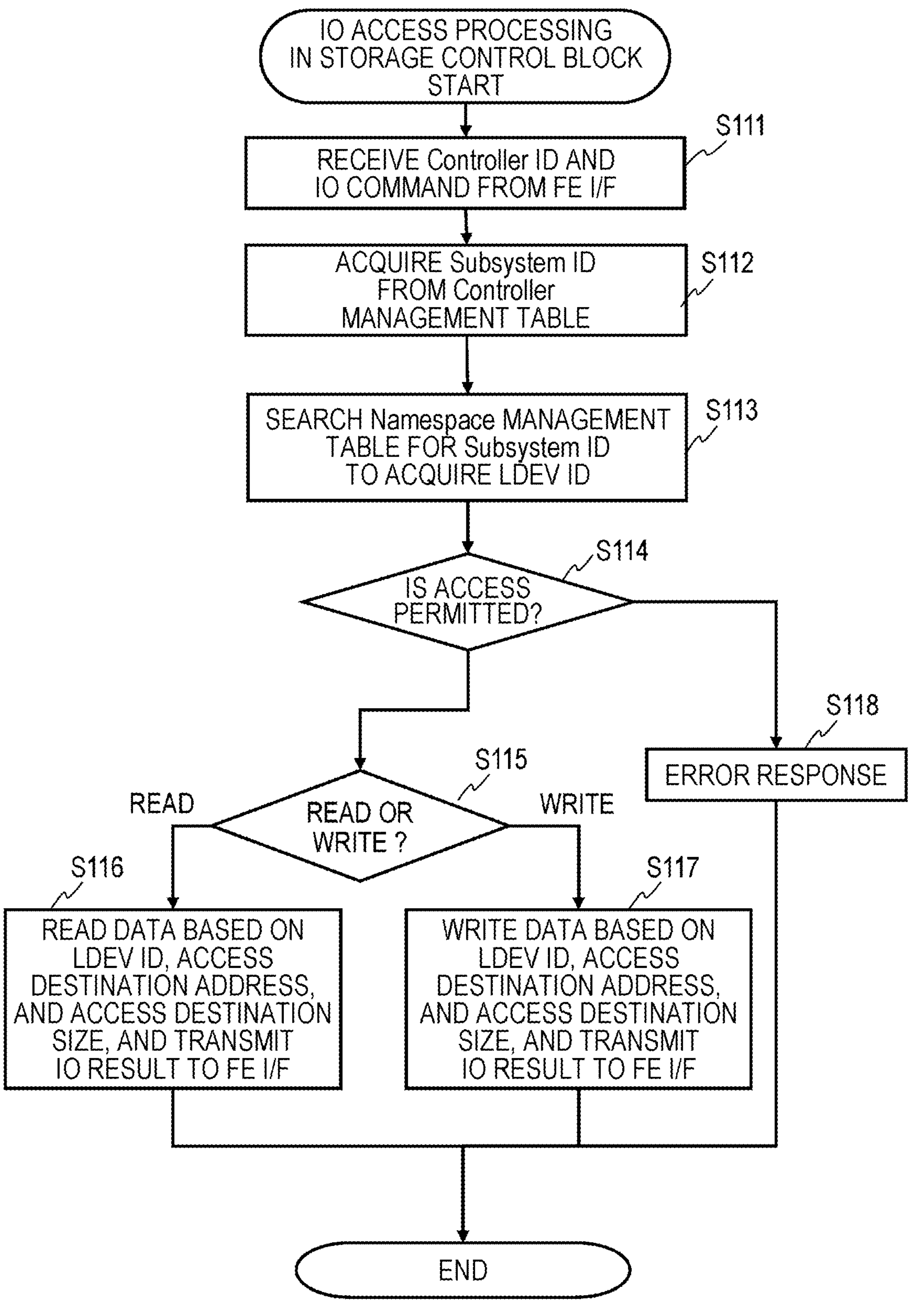
FIG. 20 is a flowchart of IO access processing in the storage control block.

FIG. 20 is a flowchart of IO access processing in the storage control block 100. The storage control block 100 receives the IO command and the Controller ID from the FE I/F 110 (S111). Next, the storage control block 100 acquires the corresponding Subsystem ID from the Controller management table T30 (S112).

Next, the storage control block 100 searches the Namespace management table T20 for a combination of the Subsystem ID and the Namespace ID to acquire the corresponding LDEV ID (S113).

Next, the storage control block 100 determines whether or not the access destination address and the access destination size can be accessed with the IO command (S114). This step is general storage access control for determining user authority or whether another host is using.

In a case where the access is not permitted (S114: NO), the storage control block 100 returns an error response to the FE I/F 110 (S118). In a case where the access is permitted (S114: YES), the storage control block 100 determines whether the IO command is the read command or the write command (S115).

In a case where the IO command is the read command (S115: READ), the storage control block 100 reads data of the access destination size from the access destination address of the LDEV indicated by the LDEV ID, and returns the data to the FE I/F 110 as an IO result (S116). In a case where the IO command is the write command (S115: WRITE), in the LDEV indicated by the LDEV ID, data of the access destination size is written to the access destination address, and a success response is returned to the FE I/F 110 as an IO result (S117).

Figure 21:
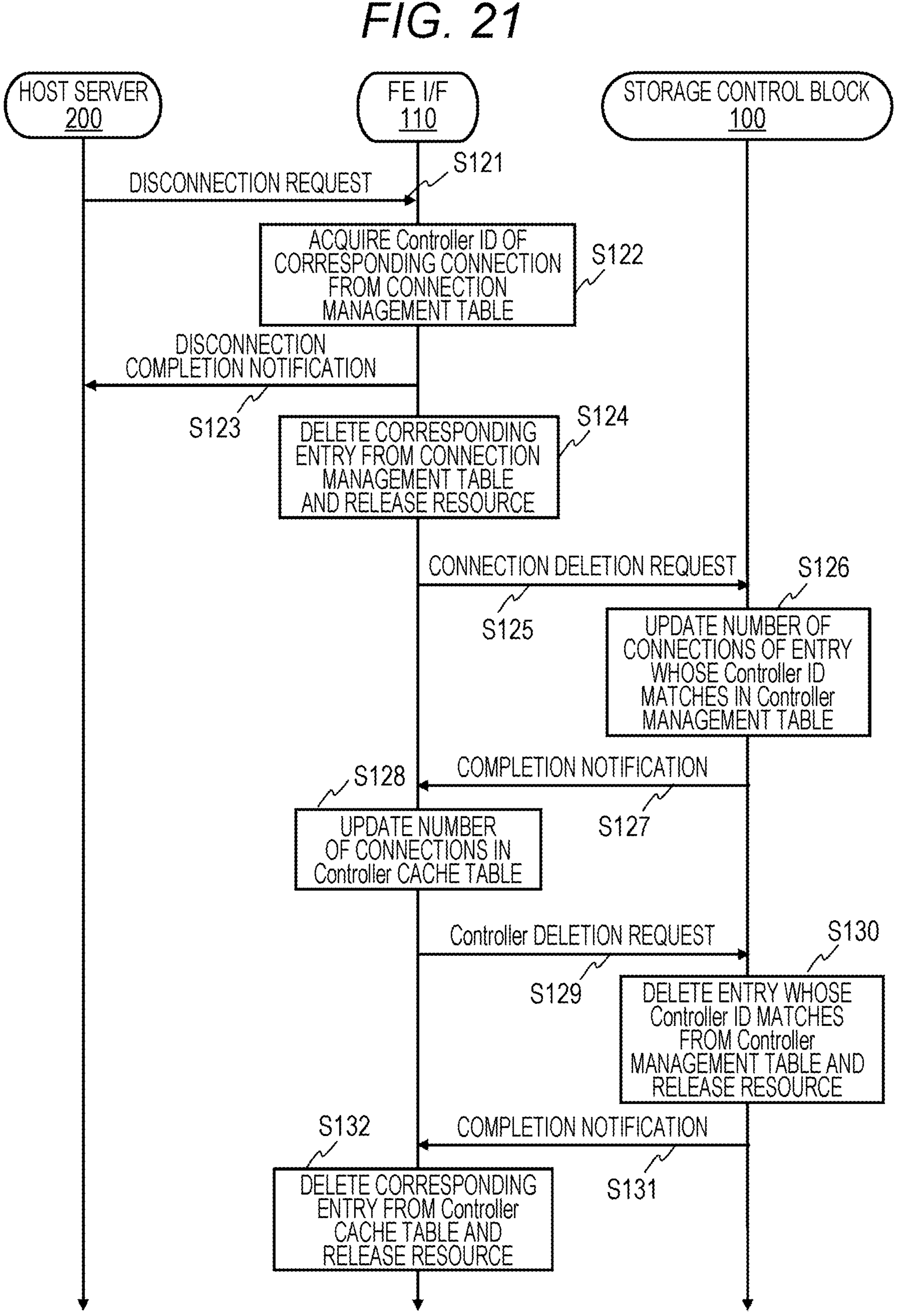
FIG. 21 is a sequence diagram of disconnection processing triggered by the host server.

Hereinafter, disconnection processing triggered by the host server 200 will be described. FIG. 21 is a sequence diagram of the disconnection processing triggered by the host server. The FE I/F 110 receives a disconnection request from the host server (S121). termination of the TCP connection by the host server 200 may be a trigger.

Next, the FE I/F 110 acquires the Controller ID of the corresponding connection from the connection management table T60 (S122). The FE I/F 110 returns a disconnection completion notification to the host server 200 and terminates the connection (S123). In a case where the termination of the TCP connection is the trigger, this step is unnecessary.

Next, the FE I/F 110 deletes the corresponding entry of the connection management table T60 and releases the resource (S124). Next, the FE I/F 110 transmits a connection deletion request to the storage control block 100 (S125). The connection deletion request includes information regarding the Controller ID and the updated number of connections.

Upon receiving the connection deletion request from the FE I/F 110, the storage control block 100 updates the number of connections of the entry whose Controller ID matches in the Controller management table T30 (S126). Here, the number of connections is subtracted by 1. Thereafter, the storage control block 100 transmits a completion notification to the FE I/F 110 (S127).

Upon receiving the completion notification, the FE I/F 110 updates the number of connections (the current number of queues) in the Controller cache table T50 (S128) Here, the value of the number of connections is subtracted by 1.

In a case where the number of connections (the current number of IO queues) in the Controller cache table T50 is 0, the FE I/F 110 transmits a Controller deletion request to the storage control block 100 (S129). The Controller deletion request includes the Controller ID of the target.

Upon receiving the Controller deletion request, the storage control block 100 deletes the entry whose Controller ID matches in the Controller management table T30 and releases the resource (S130). Thereafter, the storage control block 100 transmits a completion notification to the FE I/F 110 (S131). Upon receiving the completion notification, the FE I/F 110 deletes the corresponding entry in the Controller cache table T50 and releases the resource (S132).

Next, processing in each of the FE I/F 110 and the storage control block 100 in the disconnection processing triggered by the host server described with reference to FIG. 21 will be described with reference to a flowchart. In the following description, the same steps as those in FIG. 21 are denoted by different reference numerals.

Figure 22:
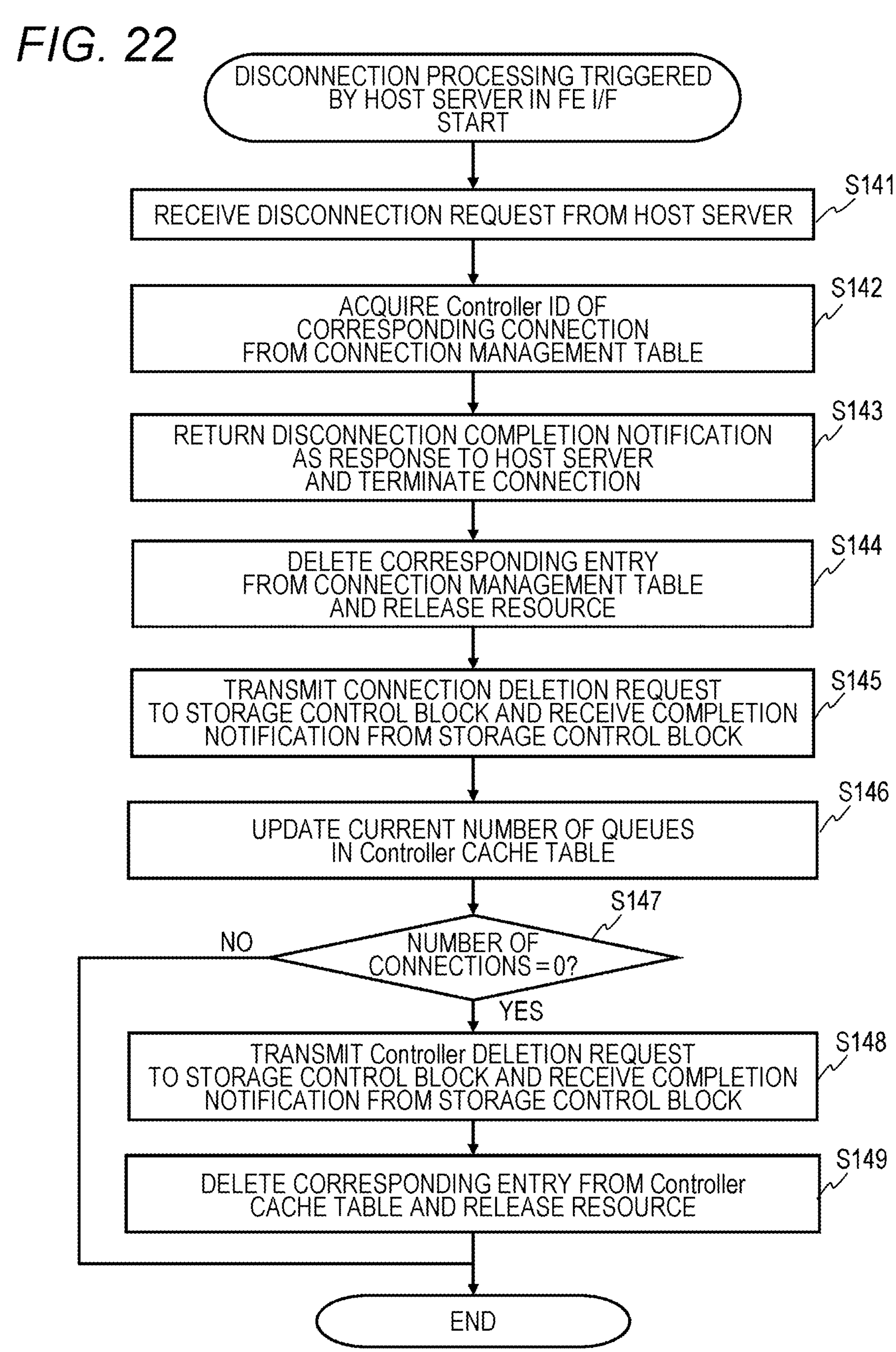
FIG. 22 is a flowchart of disconnection processing triggered by the host server in the FE I/F.

FIG. 22 is a flowchart of disconnection processing triggered by the host server in the FE I/F 110. First, the FE I/F 110 receives a disconnection request from the host server (S141). As described above, the termination of the TCP connection by the host server 200 may be the trigger.

Next, the FE I/F 110 acquires the Controller ID of the corresponding connection from the connection management table T60 (S142). The FE I/F 110 returns a disconnection completion notification to the host server 200 and terminates the connection (S143). In a case where the termination of the TCP connection is the trigger, this step is unnecessary.

Next, the FE I/F 110 deletes the corresponding entry of the connection management table T60 and releases the resource (S144). Next, the FE I/F 110 transmits a connection deletion request to the storage control block 100 and receives a completion notification therefor (S145). The connection deletion request includes information regarding the Controller ID and the updated number of connections.

Upon receiving the completion notification, the FE I/F 110 updates the number of connections (the current number of queues) in the Controller cache table T50 (S128). Here, the value of the number of connections is subtracted by 1. The FE I/F 110 determines whether or not the number of connections (the current number of IO queues) in the Controller cache table T50 is 0 (S147).

In a case where the number of connections is larger than 0 (S147: NO), this flow ends. In a case where the number of connections is 0 (S147: YES), the FE I/F 110 transmits a Controller deletion request to the storage control block 100 and receives a completion notification from the storage control block 100 (S148). The Controller deletion request includes the Controller ID of the target. Next, the FE I/F 110 deletes the corresponding entry in the Controller cache table T50 and releases the resource (S149).

Figure 23:
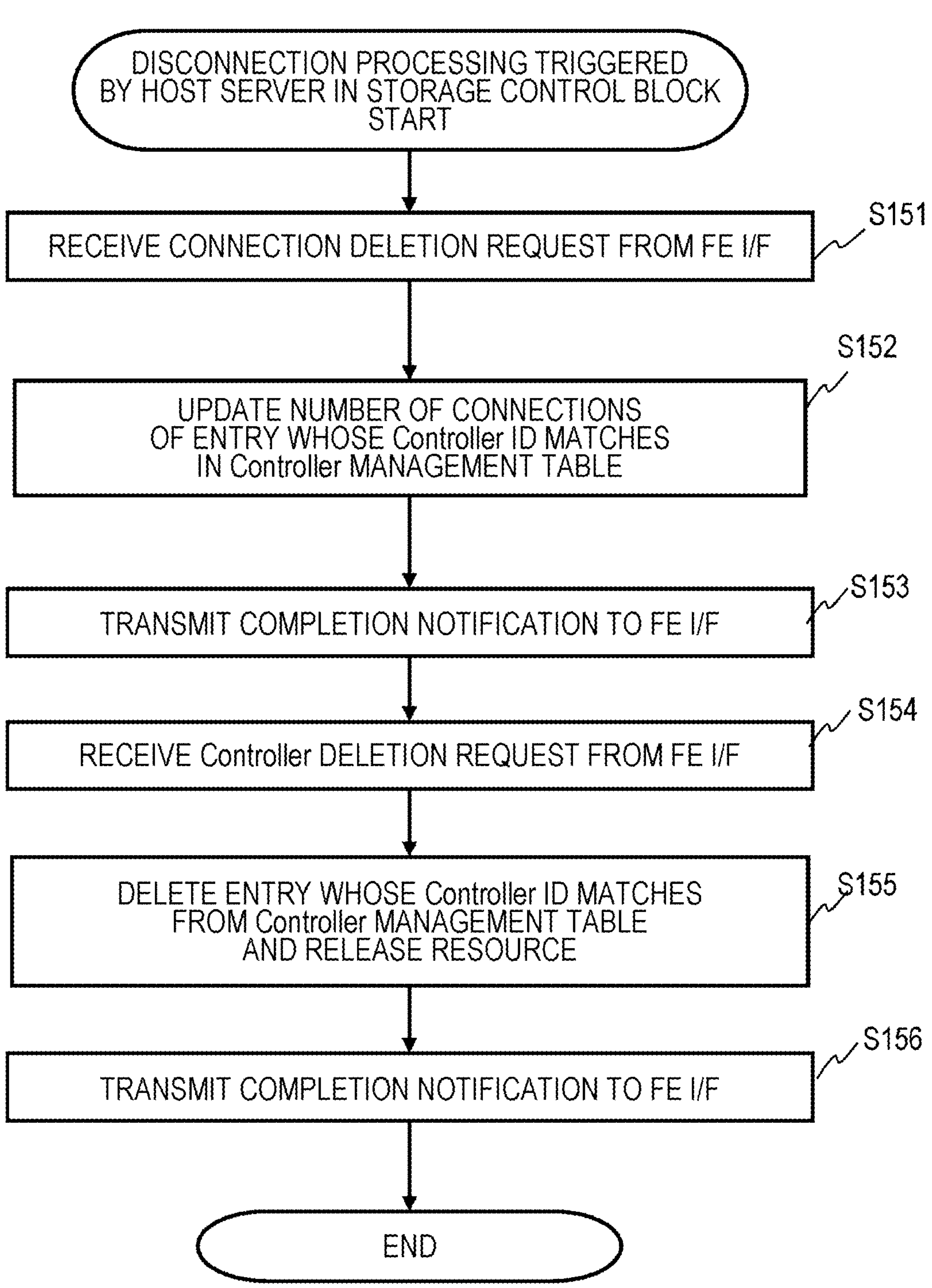
FIG. 23 is a flowchart of disconnection processing triggered by the host server in the storage control block.

FIG. 23 is a flowchart of disconnection processing triggered by the host server in the storage control block 100. The storage control block 100 receives a connection deletion request from the FE I/F 110 (S151). The connection deletion request indicates the Controller ID and the updated number of connections. The storage control block 100 updates the number of connections of the entry whose Controller ID matches in the Controller management table T30 (S152). Here, the number of connections is subtracted by 1. Next, the storage control block 100 transmits a completion notification to the FE I/F 110 (S153).

Thereafter, the storage control block 100 receives a Controller deletion request (S154). The Controller deletion request indicates the Controller ID. The storage control block 100 deletes the entry whose Controller ID matches in the Controller management table T30 and releases the resource (S155). Next, the storage control block 100 transmits a completion notification to the FE I/F 110 (S156).

Figure 24:
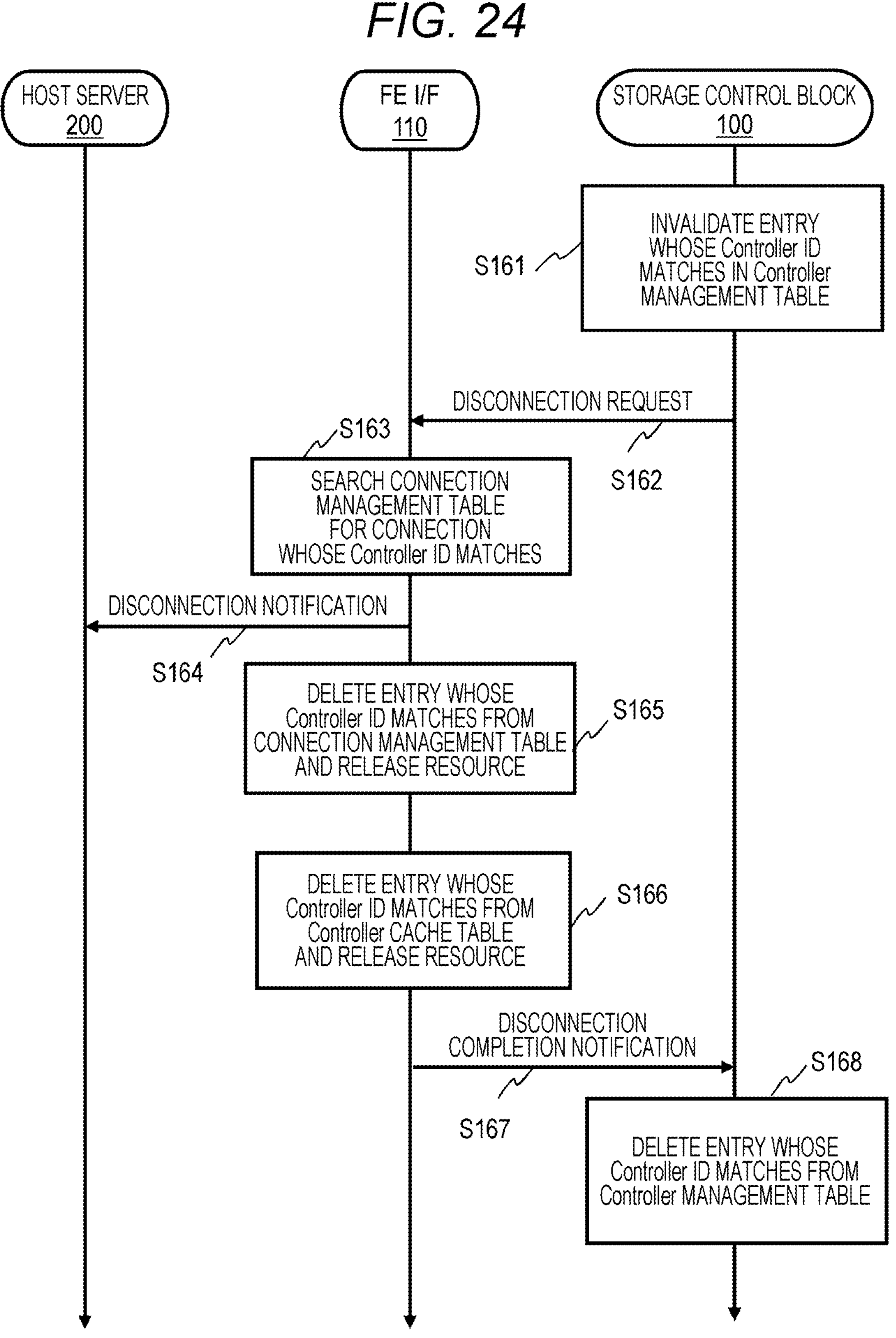
FIG. 24 is a sequence diagram of disconnection processing triggered by a storage system.

Hereinafter, disconnection processing triggered by the storage system 1 will be described. FIG. 24 is a sequence diagram of the disconnection processing triggered by the storage system. The storage control block 100 invalidates the entry whose Controller ID matches in the Controller management table T30 in response to an operator operation, occurrence of an error in the storage system 1, or the like (S161). The invalidation of the entry may, for example, set the number of scheduled queues to a negative number, add an invalidation flag to the entry, or temporarily delete the entry. Next, the storage control block 100 transmits a disconnection request designating the Controller ID to the FE I/F 110 (S162).

Upon receiving the disconnection request, the FE I/F 110 searches the connection management table T60 for a connection whose Controller ID matches (S163). The FE I/F 110 transmits a disconnection notification to the host server 200 of all the matching connections and terminates the connection (S164).

Next, the FE I/F 110 deletes the entry whose Controller ID matches from the connection management table T60 and releases the resource (S165). Further, the FE I/F 110 deletes the entry whose Controller ID matches from the Controller cache table T50 and releases the resource (S166). Thereafter, the FE I/F 110 transmits a disconnection completion notification to the storage control block 100 (S167).

Upon receiving the disconnection completion notification from the FE I/F 110, the storage control block 100 deletes the entry whose Controller ID matches from the Controller management table T30 (S168).

Next, processing in each of the FE I/F 110 and the storage control block 100 in the disconnection processing triggered by the storage system described with reference to FIG. 24 will be described with reference to a flowchart. In the following description, the same steps as those in FIG. 24 are denoted by different reference numerals.

Figure 25:
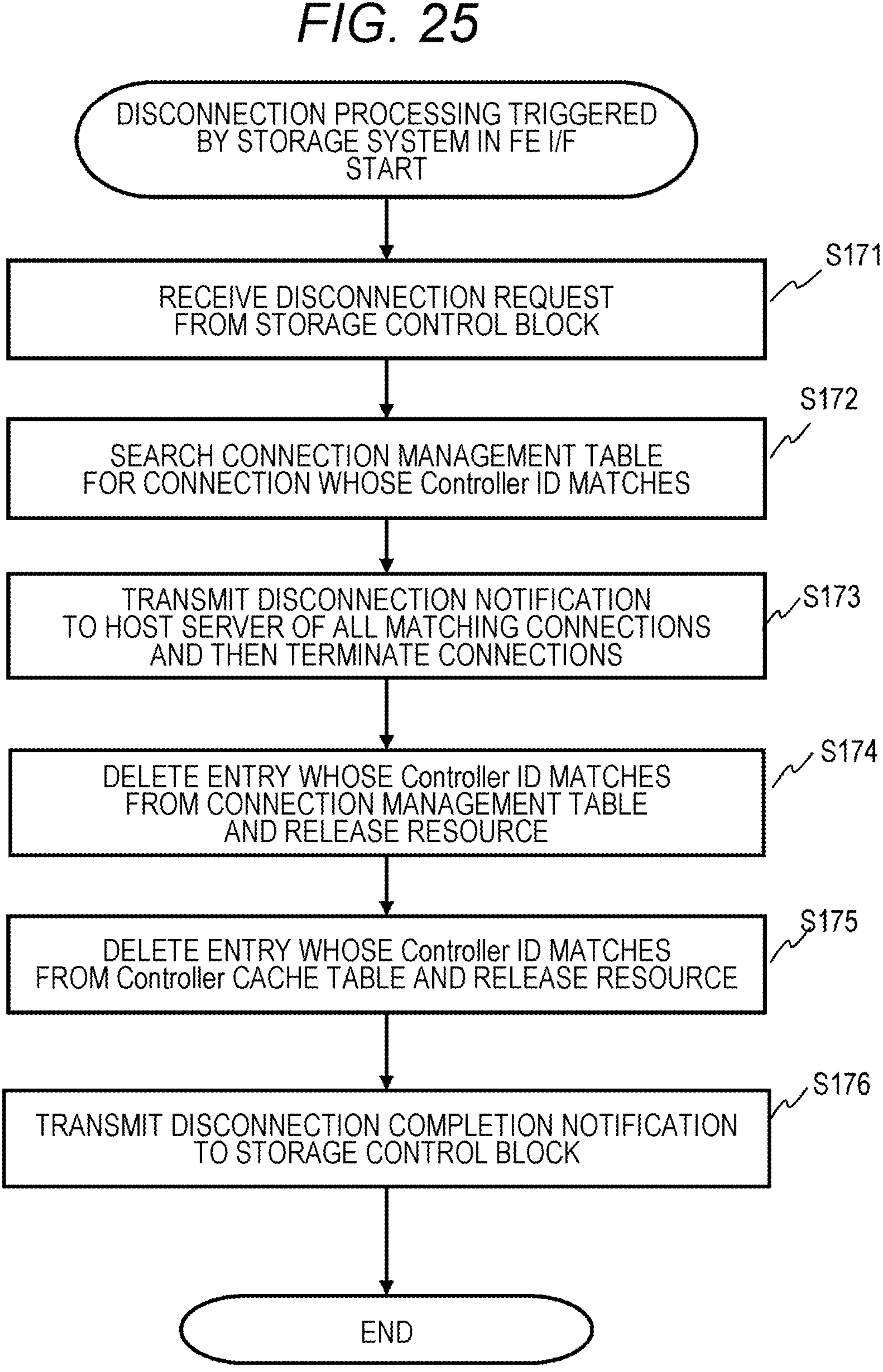
FIG. 25 is a flowchart of disconnection processing triggered by the storage system in the FE I/F.

FIG. 25 is a flowchart of disconnection processing triggered by the storage system in the FE I/F 110. The FE I/F 110 receives a disconnection request including the Controller ID from the storage control block 100 (S171). The FE I/F 110 searches the connection management table T60 for a connection whose Controller ID matches (S172). The FE I/F 110 transmits a disconnection notification to the host server 200 of all the matching connections, and then terminates the connection (S173).

Next, the FE I/F 110 deletes the entry whose Controller ID matches in the connection management table and releases the resource (S174). Next, the FE I/F 110 deletes the entry whose Controller ID matches from the Controller cache table and releases the resource (S175). The FE I/F 110 transmits a disconnection completion notification to the storage control block (S176).

Figure 26:
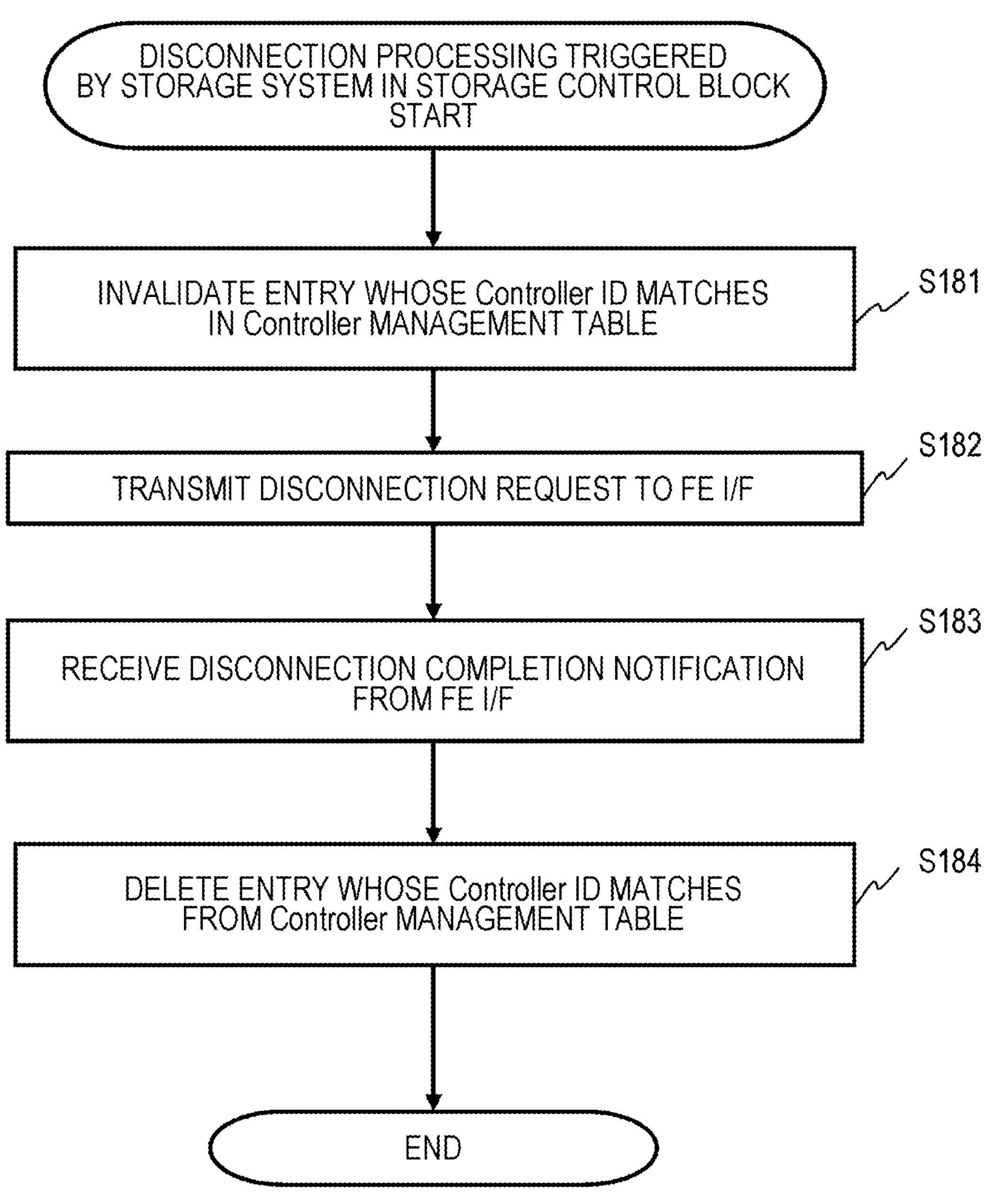
FIG. 26 is a flowchart of disconnection processing triggered by the storage system in the storage control block.

FIG. 26 is a flowchart of disconnection processing triggered by the storage system in the storage control block 100. The storage control block 100 invalidate the entry whose Controller ID matches in the Controller management table T30 in response to an operator operation, occurrence of an error in the storage system 1, or the like (S181). The invalidation of the entry may, for example, set the number of scheduled queues to a negative number, add an invalidation flag to the entry, or temporarily delete the entry. In a case where the entry has already been deleted, updating of the Controller management table T30 is omitted.

Next, the storage control block 100 transmits a disconnection request designating the Controller ID to the FE I/F 110 (S182). Thereafter, the storage control block 100 receives a disconnection completion notification from the FE I/F 110 (S183). Next, the storage control block 100 deletes the entry whose Controller ID matches from the Controller management table T30 (S184). In a case where the entry has already been deleted, the deletion of the entry is omitted.

Various modifications can be made to the above embodiment. For example, in the Controller management table T30, the information regarding the number of connections may be omitted. In this case, between the FE I/F 110 and the storage control block 100, communication of information regarding the number of connections, processing regarding update of the number of connections to the storage control block 100 in the FE I/F 110, and processing regarding the number of connections in the storage control block 100 can be omitted. As a result, when the IO queue connection is established, the communication between the FE I/F 110 and the storage control block 100 can be omitted, and a time for establishment of connection (Association) to the Controller can be further shortened.

In addition to the number of connections, the number of reserved queues (the number of queues to be permitted) in the Controller management table T30 may be omitted. In this case, at the time of initialization, the storage control block 100 notifies the FE I/F 110 of the number of reserved queues, and thereafter, the FE I/F 110 manages the number of reserved queues. As a result, the connection (Association) to the Controller is managed by the FE I/F 110, and the processing in the FE I/F 110 can be simplified by reducing the involvement of the storage control block 100. However, since the number of reserved queues cannot be managed by the storage control block 100, an instruction from the storage control block 100 to the FE I/F 110 is required to change the number of reserved queues in the middle.

In the description of the above processing, the order of the steps can be changed within a range in which consistency can be maintained, and the preceding and subsequent steps may be combined to simplify the processing or reduce the number of communications. In addition, in a case where the resource does not need to be immediately released because the resources are abundant, the release of the resource may be omitted within a range in which consistency can be maintained.

In the present embodiment, the NVMe over TCP is assumed as the communication protocol between the host server 200 and the FE I/F 110, and DMA communication is assumed between the FE I/F 110 and the storage control block 100. However, a different communication scheme may be used to optimize necessary computer resources or facilitate implementation.

For example, a communication format supported by the host server or the storage control block may be adopted to suppress additional development and additional processing. For example, the NVMe over FC or iSCSI may be used between the host server 200 and the FE I/F 110, or a user datagram protocol (UDP) may be used between the FE I/F 110 and the storage control block 100. In a case where another communication scheme is used, unique information of the communication scheme is used. For example, in the iSCSI, an iSCSI Qualified Name is used instead of the Subsystem NQN.

An information transmission method is not limited to the above example. For example, a data amount of one communication may be reduced by dividing specific information, and reliability of the processing may be enhanced by sequentially performing error detection processing. Information may be transmitted a plurality of times to achieve redundancy, or it may be checked whether or not inconsistency has occurred during communication to improve failure tolerance. In addition, the number of communications may be reduced by transmitting different pieces of information in a combined format (for example, by concatenating the Host NQN and the Host ID into a character string).

In the above embodiment, the FE I/F 110 exists between the host server 200 and the storage control block 100, and thus, in a case where information is dividedly transmitted a plurality of times, communication is performed in two stages. There are two methods as to how to handle the pieces of divided information, and any one of the two methods may be adopted.

In one method, the FE I/F 110 performs communication with one of the host server 200 and the storage control block 100 a plurality of times, combines the pieces of divided information, and transmits the combined information to the other of the host server 200 and the storage control block 100. As a result, it is possible to simplify communication. In the other method, the FE I/F 110 sequentially transmits information received from one of the host server 200 and the storage control block 100 to the other. As a result, it is possible to minimize the delay.

In a case where it can be determined from other information, or in a case where it is not essential in the communication scheme, the information may be transmitted in other forms, or only a part of the information may be transmitted. For example, in a case where the Subsystem NQN can be restored from a table that manages the Controller ID by providing only the Controller ID, it is sufficient if only the Controller ID is transmitted. As a result, the data amount of communication and communication processing can be reduced.

The response does not have to include all the pieces of information in the above example. For example, when an error occurs, the error is notified. A request ID is assigned to each request, and it is possible to distinguish which request is a response or data. Furthermore, in a case where a processing content does not change depending on a content of the response to communication, such as disconnection or deletion, transmission of the response may be omitted. By omitting transmission of the response, it is possible to avoid a deadlock due to waiting for a response, shorten a time for completing processing, and simplify processing. By transmitting the response, consistency of states at both ends of communication can be maintained when an error occurs at either end of the communication.

Second Embodiment

Hereinafter, a second embodiment of the present invention will be described. The present embodiment is different from the first embodiment in processing in an FE I/F 110 in disconnection processing triggered by a host server. The description of the first embodiment can be applied to a configuration not specifically mentioned in the following description.

FIG. 27 is a flowchart of the disconnection processing triggered by the host server in the FE I/F 110. The FE I/F 110 deletes (fully disconnects) a Controller in one disconnection. As a result, the processing in the FE I/F 110 can be simplified, and a load can be reduced to improve performance.

Referring to FIG. 27, steps S141 to S143 are similar to those in the flowchart illustrated in FIG. 22 of the first embodiment. After step S143, the FE I/F 110 transmits a disconnection notification to a host server 200 for all entries of a corresponding Controller ID in a connection management table T60, and terminates all connections (S191). The FE I/F 110 deletes all the entries of the corresponding Controller ID from the connection management table T60 and releases a resource (S192). Steps S148 and S149 thereafter are similar to those in the flowchart illustrated in FIG. 22 of the first embodiment.

Third Embodiment

Hereinafter, a third embodiment of the present invention will be described. In the present embodiment, a connection ID is added to the configuration of the connection management table T60 of the first embodiment. Information transmitted from an FE I/F 110 to a storage control block 100 includes the connection ID. When the storage control block 100 stores processing in a log, the connection ID notified from the FE I/F 110 is included in the log. As a result, it is possible to easily track a connection that requires a long time or a connection in which an error has occurred. Other configurations are similar to those of the first embodiment.

Fourth Embodiment

Hereinafter, a fourth embodiment of the present invention will be described. In the present embodiment, a CPU core assigned for a connection is managed in an FE I/F 110. Differences from the first embodiment will be described below. The description of the first embodiment can be applied to a configuration not particularly mentioned below.

FIG. 28 illustrates a configuration example of a connection management table T90 of the present embodiment. The connection management table T90 includes an assigned core field C609 in addition to the fields C601 to C608 of the connection management table T60 of the first embodiment. The assigned core field C609 indicates an identifier of a CPU core that performs processing for a corresponding connection.

The FE I/F 110 includes information of the assigned core in a request to a storage control block 100. When the storage control block 100 stores processing in a log, the storage control block 100 includes the information (including a core ID) of the assigned core notified from the FE I/F 110 in the log. Note that such a configuration may be omitted.

The storage control block 100 includes the ID of the assigned core notified from the FE I/F 110 in a response indicating a processing result transmitted to the FE I/F 110. At the time of "disconnection triggered by a storage control block", the storage control block 100 sets an invalid value as the response.

When the FE I/F 110 processes the response from the storage control block 100, the FE I/F 110 sets the assigned core as a core that performs processing in the FE I/F 110 by referring to the included ID of the assigned core.

According to the present embodiment, in IO access, the FE I/F 110 can immediately distribute processing to the assigned core for the IO access based on the response from the storage control block 100, and thus, it is possible to equalize a processing load between cores, which improves cache efficiency and reduces latency. Information transmitted between the FE I/F 110 and the storage control block 100 may include a connection ID as in the third embodiment instead of the ID of the assigned core. The FE I/F 110 can identify the assigned core by referring to the connection management table T90. Such a configuration further simplifies the implementation of both the third and fourth embodiments.

Note that the present invention is not limited to the embodiments described above, but includes various modified examples. For example, the above-described embodiments have been described in detail in order to explain the present invention in an easy-to-understand manner, and the present invention is not necessarily limited to those having all the configurations described. Further, a part of a configuration of an embodiment can be replaced with a configuration of another embodiment, and a configuration of an embodiment can be added with a configuration of another embodiment. In addition, a part of the configuration of each embodiment can be added with another configuration, can be deleted, and can be replaced with another configuration.

In addition, some or all of the above-described configurations, functions, processing units, and the like may be implemented by hardware, for example, by designing with an integrated circuit. In addition, each of the above-described configurations, functions, and the like may be implemented by software in a manner in which a processor interprets and executes a program for implementing each function. Information such as a program, a table, and a file for implementing each function can be stored in a recording device such as a memory, a hard disk, or an SSD, or a recording medium such as an IC card or an SD card.

In addition, the control lines and information lines indicate those that are considered necessary for explanation, and do not necessarily indicate all the control lines and information lines in the product. In practice, it can be considered that almost all configurations are interconnected.

What is claimed is:

1. A storage system that communicates with a host in a session including one or more connections, the storage system comprising:

a front-end interface;

a processor; and a storage area, wherein the storage area stores session management information for managing the session with the host, the front-end interface stores connection management information for managing the one or more connections of the session, and the front-end interface controls access from the host by referring to the connection management information, wherein, in termination of a connection of the one or more connections between the host and the front-end interface, the front-end interface acquires information of the session corresponding to the connection from the connection management information, the front-end interface transmits a disconnection completion notification to the host, the front-end interface designates the session and transmits a disconnection request for the connection to the processor, and the processor updates the session management information in response to the received disconnection request.

2. The storage system according to claim 1, wherein the front-end interface stores session holding information including a cache of information included in the session management information, the front-end interface adds a new entry to the connection management information in establishment of a first connection of the one or more connections of the session, the front-end interface transmits information regarding the first connection to the processor, the processor adds an entry of a new session as the session including the first connection to the session management information, the processor transmits information of the new session to the front-end interface, the front-end interface updates the session holding information with the received information of the new session, and the front-end interface controls the access from the host by referring to the connection management information and the session holding information.

3. The storage system according to claim 2, wherein the session holding information manages a number of scheduled connections in the session, and the front-end interface returns an error to the host in a case where a number of connections to be established, as requested by the host, exceeds the number of scheduled connections.

4. The storage system according to claim 1, wherein the front-end interface includes a connection ID managed by the front-end interface in a request to the processor, and the processor includes the connection ID in log information.

5. The storage system according to claim 1, wherein the front-end interface sets an assigned core for a connection of the one or more connections, the front-end interface includes information of the assigned core of the connection in a request to the processor, the processor includes the information of the assigned core in a processing result to be transmitted to the front-end interface, and the front-end interface continues processing of the connection by the assigned core.

6. A storage system that communicates with a host in a session including one or more connections, the storage system comprising:

a front-end interface;

a processor; and a storage area, wherein the storage area stores session management information for managing the session with the host, the front-end interface stores connection management information for managing the one or more connections of the session, and the front-end interface controls access from the host by referring to the connection management information, wherein, in termination of a connection of the one or more connections between the host and the front-end interface, the front-end interface acquires information of the session corresponding to the connection from the connection management information, the front-end interface transmits a disconnection completion notification to the host, in a case where a number of input/output connections of the session is 0, the front-end interface transmits a deletion request for the session to the processor, and the processor deletes information of the session from the session management information.

7. The storage system according to claim 6, wherein the front-end interface stores session holding information including a cache of information included in the session management information, the front-end interface adds a new entry to the connection management information in establishment of a first connection of the one or more connections of the session, the front-end interface transmits information regarding the first connection to the processor, the processor adds an entry of a new session as the session including the first connection to the session management information, the processor transmits information of the new session to the front-end interface, the front-end interface updates the session holding information with the received information of the new session, and the front-end interface controls the access from the host by referring to the connection management information and the session holding information.

8. The storage system according to claim 7, wherein the session holding information manages a number of scheduled connections in the session, and the front-end interface returns an error to the host in a case where a number of connections to be established, as requested by the host, exceeds the number of scheduled connections.

9. The storage system according to claim 6, wherein the front-end interface includes a connection ID managed by the front-end interface in a request to the processor, and the processor includes the connection ID in log information.

10. The storage system according to claim 6, wherein the front-end interface sets an assigned core for a connection of the one or more connections, the front-end interface includes information of the assigned core of the connection in a request to the processor, the processor includes the information of the assigned core in a processing result to be transmitted to the front-end interface, and the front-end interface continues processing of the connection by the assigned core.

* * * * *